US009947161B2

(12) United States Patent
Suzuki

(10) Patent No.: US 9,947,161 B2
(45) Date of Patent: Apr. 17, 2018

(54) DISK IMAGE ACQUIRING DEVICE AND DISK SORTING DEVICE

(71) Applicant: ASAHI SEIKO CO., LTD., Tokyo (JP)

(72) Inventor: Daishi Suzuki, Saitama (JP)

(73) Assignee: ASAHI SEIKO CO., LTD., Tokyo (JP)

( * ) Notice: Subject to any disclaimer, the term of this patent is extended or adjusted under 35 U.S.C. 154(b) by 970 days.

(21) Appl. No.: 13/865,577

(22) Filed: Apr. 18, 2013

(65) Prior Publication Data

US 2014/0313319 A1 Oct. 23, 2014

(51) Int. Cl.
*H04N 7/18* (2006.01)
*G07D 5/00* (2006.01)

(52) U.S. Cl.
CPC .................................... *G07D 5/005* (2013.01)

(58) Field of Classification Search
CPC .... B07C 3/14; B07C 3/00; B07C 3/18; B07C 5/3422; B07C 5/342; B07C 5/366; B07C 5/10; G06Q 10/08; G01N 21/8806; Y10S 209/93; Y10S 209/939; G06F 17/30247; G06F 17/30265; G07D 5/005
See application file for complete search history.

(56) References Cited

U.S. PATENT DOCUMENTS 6,374,980 B1 * 4/2002 Ishida ...................... G07D 5/02 194/317
2007/0249276 A1 * 10/2007 Irie ........................ G07D 5/005 453/4
2012/0247918 A1 * 10/2012 Mirumachi ............ G07D 5/005 194/302
2012/0249780 A1 10/2012 Mirumachi et al.

FOREIGN PATENT DOCUMENTS

CN 101014978 8/2007
CN 102262796 11/2011
EP 2390848 11/2011
EP 2506224 10/2012
(Continued)

OTHER PUBLICATIONS

Search report from E.P.O., dated Oct. 17, 2013.
Search report in China Patent Application No. 201310184632.3, dated Jan. 25, 2016.

*Primary Examiner* — Farhan Mahmud
(74) *Attorney, Agent, or Firm* — Greenblum & Bernstein, P.L.C.

(57) ABSTRACT

Disk image acquiring device includes a guide for guiding a peripheral surface of a disk moving in a predetermined direction along a predetermined guide line, an imaging window defining an image-taking region on the one surface of the disk, a timing sensor to take images having a detection axis traversing a moving direction of the disk and outputting a timing signal as arrival of the disk at a predetermined position on the imaging window when the peripheral surface of the disk has been detected on the detection axis, and an imager which takes an image of the one surface of the disk via the imaging window based upon the timing signal, wherein a bisector of an angle between the guide line and the detection axis is utilized as a base line, and the imaging window is extended along the base line.

16 Claims, 12 Drawing Sheets

(56) References Cited

FOREIGN PATENT DOCUMENTS

| | | |
|---|---|---|
| JP | 09-54845 | 2/1997 |
| JP | 10-091837 | 4/1998 |
| JP | 10-302107 | 11/1998 |
| JP | 2000-163620 | 6/2000 |
| JP | 3115505 | 9/2000 |
| JP | 2001-344631 | 12/2001 |
| JP | 2002-358551 | 12/2002 |
| JP | 2007-233813 | 9/2007 |
| JP | 2007-241701 | 9/2007 |
| JP | 2009-276951 | 11/2009 |
| JP | 2013-080360 | 5/2013 |

* cited by examiner

DISK IMAGE ACQUIRING DEVICE AND DISK SORTING DEVICE

BACKGROUND OF THE DISCLOSURE

1. Field of the Invention

The present disclosure relates to a disk image acquiring device, and in particular relates to a disk image acquiring device which takes an image of a pattern formed on a surface or a back surface of a disk to acquire a taken image. More specifically, the present disclosure relates to a disk image acquiring device which can also acquire images regarding a plurality of kinds of disks having different diameters easily and securely.

Also, the present disclosure relates to a disk sorting device, and in particular relates to a disk sorting device which takes an image of a pattern formed on a surface or a back surface of a disk to acquire a taken image, compares the taken image with a reference image to discriminate authenticity of the disk, and sorts the disk based upon the discrimination result. More specifically, the present disclosure relates to a disk sorting device which can acquire images regarding a plurality of kinds of disks having different diameters easily and securely to sort the disks.

Incidentally, the disk in this specification has a concept including a coin which is currency, and a medal or a token used in a game machine.

2. Description of Related Art

A device which takes an image of a pattern formed on a surface or a back surface (hereinafter, called "disk surface") of a disk such as a coin or a medal by an image sensor to make discrimination about authenticity or denomination using the taken image is conventionally proposed, where in particular when an image of a moving disk is taken, such a fact that the disk has arrived at an image-taking position is detected by a timing sensor and an image of the disk is taken based upon a detection output of the timing sensor.

In Japanese Unexamined Patent Application Publication No. 2001-344631 (at, e.g., FIG. 1 and Paragraphs 0019 to 0031), for example, a coin discriminating device which, when a first sensor arranged on an upstream side of an image-taking position in a moving direction of a coin, starts an image-taking operation of an image sensor in advance before a coin arrives at the image-taking position and has detected passage of the coin, and performs irradiation of illumination in a short time to acquire a taken image of a coin surface by the image sensor when a second sensor has detected arrival of the coin at the image-taking position is disclosed.

In Japanese Unexamined Patent Application Publication No. 2002-358551 (at, e.g., FIG. 1 and Paragraphs 0023 to 0027), a coin discriminating device which detects arrival of a leading end of a coin by a coin detecting sensor arranged on a downstream side of an image-taking position in a moving direction of the coin and irradiates a surface of the coin with light in synchronism with detection of the coin detecting sensor to acquire an image of the coin including an outer periphery of the coin by an image sensor is disclosed.

In Japanese Unexamined Patent Application Publication No. 2007-241701 (at, e.g., FIG. 1 and FIG. 2, and Paragraph 0015), a coin image identifying device which detects that light emitted from a light emitting element has been blocked by arrival of a coin by a light receiving element to notify a coin arrival time of an image-taking timing determining means, where the image-taking timing determining means calculates an image-taking timing from the coin arrival time, and an image-taking position of the coin and a coin transportation velocity, and a control part instructs an image-taking means to take an image of the coin at a predetermined position at the image-taking timing is disclosed.

In Japanese Patent No. 3115505 (at, e.g., FIG. 2 and FIG. 3, and Paragraphs 0008 to 0016), a work image-identifying device where a plurality of coin position detectors is arranged at different positions on an upstream side in a coin transport direction and the plurality of coin position detectors are actuated selectively in response to a size of a coin is disclosed.

Now, there is a plurality of kinds of disks having different diameters, such as coins or medals, and a disk image acquiring device which acquires a taken image of a pattern formed on a disk surface is required to acquire a taken image including a whole pattern of a disk surface even regarding a disk having a different diameter. This is because discrimination accuracy lowers if a portion of an image of the pattern is not taken.

In the coin discriminating device described in the above Japanese Unexamined Patent Application Publication No. 2001-344631, there is not any consideration about handling of a coin having a different diameter, where when a diameter of a coin is different, a center position of the coin in an image-taking region is shifted to an upstream side in a moving direction of the coin. Therefore, if an image-taking region is set so as to conform to a small-diameter coin, a pattern of a large-diameter coin having a large shift amount goes over the image-taking region. In other words, there is such a problem that a diameter range of a coin which can be discriminated is small. On the other hand, when the image-taking region is expanded so as to conform to the large-diameter coin, there is such a problem that the image sensor or an illumination device becomes large in size, which results in cost increase and increase in size of the whole device. Though use of a lens having a wide field angle does not require increase in size of the image sensor, increase in size of the illumination device is unavoidable. Further, since the center position varies according to the diameter of the coin, there is also such a problem that because a general method as detecting an outer periphery of a coin to obtain the center position of the coin is applied when the center position of the coin constituting a reference for image discrimination is obtained, a processing time required for image discrimination becomes long.

In the case of the coin discriminating device described in Japanese Unexamined Patent Application Publication No. 2002-358551, though coins different in diameter are assumed, a device imaging a peripheral edge portion of a coin surface is proposed, where there is not any consideration about the case that an image of a whole pattern of a coin surface is acquired. And, since a distal end of the coin is detected by the coin detecting sensor, the center position of the coin in the image-taking region is shifted to an upstream side of the coin in the moving direction of the coin when the diameter of the coin varies. Therefore, there is a problem similar to that in the coin discriminating device described in Japanese Unexamined Patent Application Publication No. 2001-344631.

In the coin image identifying device described in Japanese Unexamined Patent Application Publication No. 2007-241701, since the image-taking timing is calculated from the image-taking position of the coin and the coin transportation velocity, an error occurs easily regarding the image-taking time, so that deviation occurs regarding the center position of the coin to the image-taking region. Therefore, since it is necessary to set the image-taking region large in anticipation of a size corresponding to the error, there is such a problem that the image sensor or the illumination device becomes large in size, which results in cost increase and increase in size of the whole device. Further, since deviation of the center position of the coin occurs, there is also such a problem that because such a general method as detecting an outer periphery of a coin to obtain the center position is applied like the cases described in Japanese Unexamined Patent Application Publication Nos. 2001-344631 and 2002-358551 when the center position of the coin constituting a reference for image discrimination is obtained, a processing time required for image discrimination becomes long.

In the work image-identifying device described in Japanese Patent No. 3115505, since the plurality of coin position detectors corresponding to diameters of coins are required, there is such a problem as increase in cost. Further, since positions and optical axes of the plurality of coin position detectors must be adjusted, there is such a problem that adjusting work becomes complicated.

SUMMARY OF THE DISCLOSURE

The present disclosure has been made in view of the above-described conventional technologies, and an feature thereof is to provide a disk image acquiring device which can acquire taken images of whole patterns formed on disk surfaces of a plurality of kinds of disks having different diameters easily and securely.

Another feature of the present disclosure is to provide a disk image acquiring device which can expand a diameter range of a disk which can be discriminated.

Still another feature of the present disclosure is to provide a disk image acquiring device which can be made small in size even if a diameter range of a disk which can be discriminated is expanded.

Still another feature of the present disclosure is to provide a disk image acquiring device which has a wide diameter range of a disk which can be discriminated and can be realized at a low price and easily.

Still another feature of the present disclosure is to provide a disk sorting device which can sort a plurality of kinds of disks having different diameters easily and securely.

Still another feature of the present disclosure is to provide a disk sorting device which can expand a diameter range of a disk which can be sorted.

Still another feature of the present disclosure is to provide a disk sorting device which can be made small in size even if a diameter range of a disk which can be sorted is expanded.

Still another feature of the present disclosure is to provide a disk sorting device which has a wide diameter range of a disk which can be discriminated and can be realized at a low price and easily.

Still another feature of the present disclosure is to provide a disk sorting device which can shorten a processing time required for sorting.

Other features of the present disclosure which have not been described herein clearly will become apparent from the following explanation and the accompanying drawings.

To achieve the above features, the disk image acquiring device and the disk sorting device according to the present disclosure are configured as follows.

(1) A disk image acquiring device of the present disclosure is a disk image acquiring device which includes a guide for guiding a peripheral surface of a disk moving in a predetermined direction along a predetermined guide line, an imaging window arranged approximately in parallel with one surface of the disk guided by the guide and defining an image-taking region on the one surface of the disk, a timing sensor to take images having a detection axis traversing a moving direction of the disk guided by the guide and outputting a timing signal as arrival of the disk at a predetermined position on the imaging window when the peripheral surface of the disk has been detected on the detection axis, and an imaging device which takes an image of the one surface of the disk via the imaging window based upon the timing signal outputted from the timing sensor to take images, wherein a bisector of an angle between the guide line and the detection axis as viewed from a direction orthogonal to the imaging window is utilized as a base line, and the imaging window is extended along the base line.

In the disk image acquiring device of the present disclosure, a disk is moved in the predetermined direction, and the disk is detected as arrival of the disk has arrived at the predetermined position when a peripheral surface of the disk has been positioned on the detection axis of the timing sensor to take images. Therefore, when the disk has arrived at the predetermined position on the imaging window, the peripheral surface of the disk is positioned on the detection axis regardless of the diameter of the disk. On the other hand, since the peripheral surface of the disk is guided along the guide line by the guide, when the disk has arrived at the imaging window, the peripheral surface of the disk is positioned on the guide line. That is, the outer periphery of the disk becomes contact with the detection axis and the guide line. This means that the center of the disk is positioned on the bisector between the guide line and the detection axis as viewed from the direction orthogonal to the imaging window. Therefore, by utilizing the bisector as the base line to extend the imaging window along the base line, even in the case of a disk having a different diameter, it is made possible to take an image of a whole pattern formed on one surface of the disk easily and securely. In other words, since a diameter range of a disk where an image of the whole pattern can be taken can be expanded, a diameter range of the disk which can be discriminated is expanded. In addition, regarding a direction orthogonal to the base line as viewed from the direction orthogonal to the imaging window, since a width of the imaging window can be set without considering the movement of the center position even in the case of a disk having a different diameter, the device can be made small in size. Since a plurality of timing sensors to take images is not required, cost is decreased, complicated adjustment is not required, and easy realization can be achieved.

Incidentally, the "detection axis" in the present disclosure means an axial line serving as a reference when a detected object is detected. In other words, when the detected object is positioned on the axial line, the detected object is detected. Furthermore, the "angle between the base line and the detection axis of the timing sensor" means an angle formed between the base line and the detection axis of the timing sensor so as to sandwich the disk when the disk is positioned on an upstream side in the moving direction of the disk regarding the detection axis of the timing sensor.

(2) Regarding a preferred example of the disk image acquiring device according to the present disclosure, in the disk image acquiring device described in the above item (1), the shape of the imaging window is a rectangle having long sides and short sides, and the long sides of the rectangle are approximately parallel with the base line. In this case, an effective imaging area of the imaging device generally has a rectangle, and there is such a merit that utilization efficiency of the imaging area of the imaging device is improved by forming the imaging window in a rectangle corresponding to the imaging area.

(3) Regarding another example of the disk image acquiring device according to the present disclosure, in the disk image acquiring device described in the above item (2), the imaging window is approximately symmetrical about the base line as viewed from the direction orthogonal to the imaging window. In this case, if a time difference from detection of the disk performed by the timing sensor to take images up to image-taking of the disk performed by the imaging device falls within a substantially negligible range, there is such a merit that, since the center of the disk is disposed at the center of the imaging window in a direction of the short side of the rectangle, an image of the whole pattern can be taken further efficiently.

(4) Regarding another example of the disk image acquiring device according to the present disclosure, in the disk image acquiring devices described in the above item (3), the timing sensor to take images comprises a photoelectric sensor, and a light axis of the photoelectric sensor forms the detection axis. In this case, since the disk is detected by light with high directionality and linearity, there is a merit that detection accuracy is elevated.

(5) Regarding a preferred example of the disk image acquiring device according to the present disclosure, in the disk image acquiring devices described in the above items (1) to (4), the imaging device comprises a surface floodlight arranged in parallel to the imaging window and projecting diffusion light toward the imaging window, a half mirror disposed between the surface floodlight and the imaging window and allowing transmission of diffusion light from the surface floodlight toward the imaging window and reflecting reflected light from the disk opposed to the imaging window toward a direction parallel to the imaging window, and an area image sensor receiving reflected light from the half mirror to take an image of the one surface of the disk opposed to the imaging window. In this case, even if a rotation phase of the disk is different, there is such a merit that image-taking with less influence of a shadow becomes possible.

(6) A disk sorting device according to the present disclosure is a disk sorting device which includes a guide for guiding a peripheral surface of a disk moving in a predetermined direction along a predetermined guide line, an imaging window arranged approximately in parallel with one surface of the disk guided by the guide and defining an image-taking region on the one surface of the disk, an timing sensor to take images having a detection axis traversing a moving direction of the disk guided by the guide and outputting a timing signal as arrival of the disk at a predetermined position on the imaging window when the peripheral surface of the disk has been detected on the detection axis, an imaging device which take an image of the one surface of the disk via the imaging window based upon the timing signal outputted from the timing sensor to take images, a discriminator (discriminating device) which compares a taken image acquired by the imaging device with a predetermined reference image to make judgement about authenticity of the disk, and a sorting device which sorts the disk into truth or false based upon the discrimination result obtained by the discriminating device, wherein a bisector of an angle between the guide line and the detection axis as viewed from a direction orthogonal to the imaging window is utilized as a base line, and the imaging window is extended along the base line.

In the disk sorting device according to the present disclosure, a disk is moved in the predetermined direction, and the disk is detected as arrival of the disk at the predetermined position on the imaging window when a peripheral surface of the disk has been positioned on the detection axis of the timing sensor to take images. Therefore, when the disk has arrived at the predetermined position on the imaging window, the peripheral surface of the disk is positioned on the detection axis regardless of the diameter of the disk. On the other hand, since the peripheral surface of the disk is guided along the guide line by the guide, when the disk has arrived at the imaging window, the peripheral surface of the disk is positioned on the guide line. That is, the outer periphery of the disk becomes contact with the detection axis and the guide line. This means that the center of the disk is positioned on the bisector between the guide line and the detection axis as viewed from the direction orthogonal to the imaging window. Therefore, by utilizing the bisector as the base line to extend the imaging window along the base line, even in the case of a disk having a different diameter, it is made possible to take an image of a whole pattern formed on one surface of the disk easily and securely, and easy and secure sorting is eventually made possible. In other words, since a diameter range of a disk where an image of the whole pattern can be taken can be expanded, a diameter range of a disk which can be discriminated is expanded. In addition, regarding a direction orthogonal to the base line as viewed from the direction orthogonal to the imaging window, since a width of the imaging window can be set without considering the movement of the center position even in the case of the disk having a different diameter, the device can be made small in size. Since a plurality of timing sensors to take images is not required, cost is decreased, complicated adjustment is not required, and easy realization can be achieved. Furthermore, when the center position of the disk serving as the reference for image discrimination is obtained, the center position is positioned on the bisector of the angle between the guide line and the detection axis, so that extraction of the center position is simple and easy, and a processing time required for discrimination is shortened. In other words, the time required for sorting is shortened, so that faster sorting is made possible.

(7) Regarding a preferred example of the disk sorting device according to the present disclosure, in the disk sorting device described in the above item (6), the shape of the imaging window is a rectangle having long sides and short sides, and the long sides of the rectangle are approximately parallel with the base line. In this case, an effective imaging area of the imaging device generally has a rectangle, and there is such a merit that utilization efficiency of the imaging area of the imaging device is improved by forming the imaging window in a rectangle corresponding to the imaging area.

(8) Regarding another preferred example of the disk sorting device according to the present disclosure, in the disk sorting device described in the above item (7), the imaging window is approximately symmetrical about the base line as viewed from the direction orthogonal to the imaging window. In this case, if a time difference from detection of the disk performed by the timing sensor to take images up to image-taking of the disk performed by the imaging device falls within a substantially negligible range, there is such a merit that, since the center of the disk is disposed at the center of the imaging window in a direction of the short side of the rectangle, an image of the whole pattern can be taken further efficiently.

(9) Regarding another preferred example of the disk sorting device according to the present disclosure, in the disk sorting devices described in the above item (8), the timing sensor to take images comprises a photoelectric sensor, and a light axis of the photoelectric sensor forms the detection axis. In this case, since the disk is detected by light with high directionality and linearity, there is a merit that detection accuracy is elevated.

(10) Regarding another preferred example of the disk sorting device according to the present disclosure, in the disk sorting device described in the above items (6) to (9), the imaging device includes a surface floodlight arranged in parallel to the imaging window and projecting diffusion light toward the imaging window, a half mirror disposed between the surface floodlight and the imaging window and allowing transmission of diffusion light from the surface floodlight toward the imaging window and reflecting reflected light from the disk opposed to the imaging window toward a direction parallel to the imaging window, and an area image sensor receiving reflected light from the half mirror to take an image of the one surface of the disk opposed to the imaging window. In this case, even if a rotation phase of the disk is different, there is such a merit that imaging with less influence of a shadow becomes possible and discrimination accuracy eventually increases.

BRIEF DESCRIPTION OF THE DRAWINGS

The features and advantages of the invention will be more clearly understood from the following description taken in conjunction with the accompanying drawings.

DETAILED DESCRIPTION OF THE PREFERRED EMBODIMENTS

Figure 1:
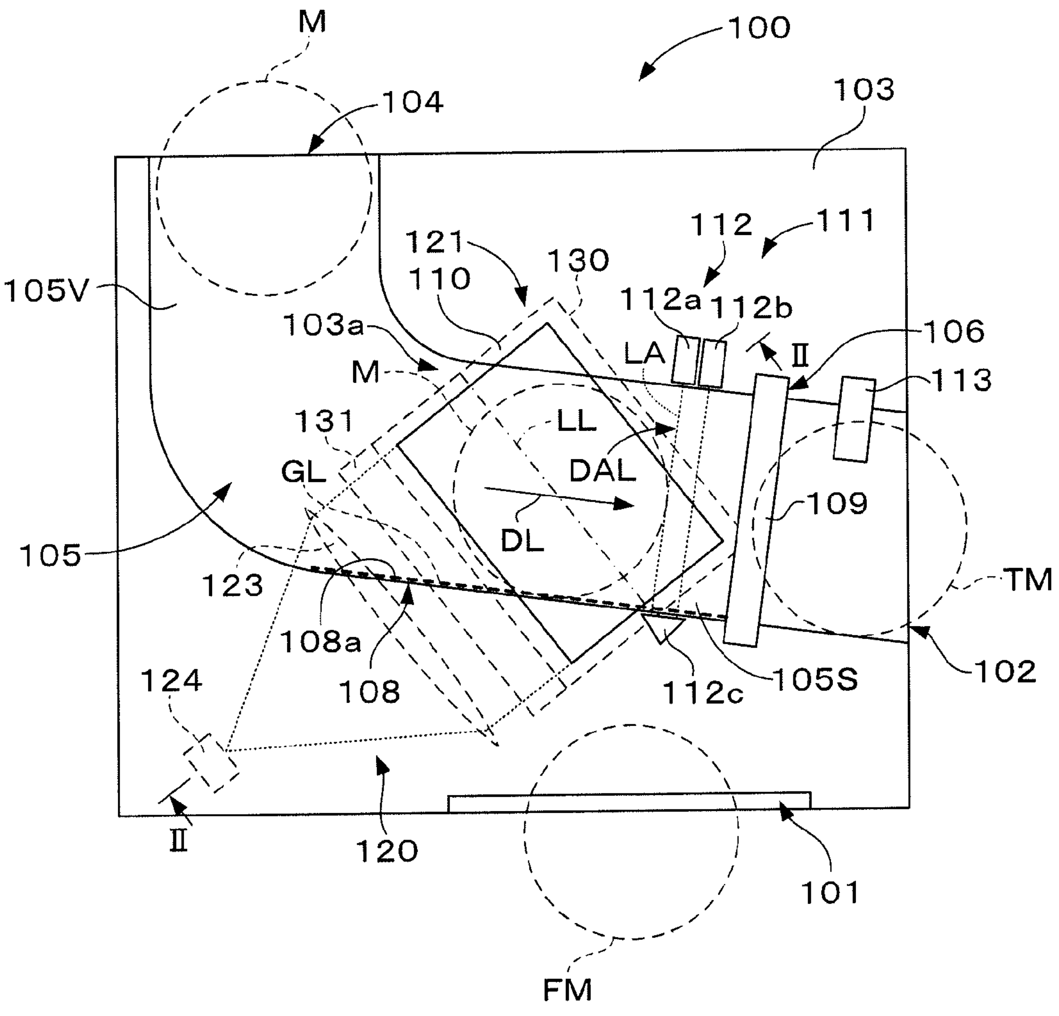
FIG. 1 is a schematic front view showing a medal sorting device according to an embodiment of the present disclosure.

Embodiments of the present disclosure will be described below with reference to the accompanying drawings.

(Configuration)

As one example of a disk sorting device according to the present disclosure, a medal sorting device 100 shown in FIGS. 1 to 4 will be described. The medal sorting device 100 is incorporated into a game machine or the like to be used, and has a function of making discrimination about authenticity of a medal which has been slotted to sort a false medal FM to a medal return slot 101 and guiding a true medal TM to a medal reception port 102. The medal sorting device 100 includes a main body 103, the medal slot 104, a medal passage 105, a sorting gate 106, a two-dimensional imager (imaging device) 120, a timing sensor to take images 111, a medal counting sensor 113, a controller 140, a ROM (Read Only Memory) 142, a RAM (Random Access Memory) 143, a user interface 151, a status display 152, a registration switch 53, and a security volume 154.

The main body 103 is formed with the medal slot 104 and the medal passage 105, and has a function that the sorting gate 106, the two-dimensional imaging device 120, the timing sensor to take images 111, and the medal counting sensor 113 are attached to the main body 103. The main body 103 has a rectangular box shape and is made of resin. In the main body 103, a rectangular imaging window 110 is provided in one side wall of the medal passage 105.

The medal slot 104 has a function of receiving a coin which has been slotted into a slotting port (not shown) of the game machine or the like. The medal slot 104 is formed near a left end portion of an upper face of the main body 103 and has a slit-like sectional shape.

The medal passage 105 has a function of guiding a medal M which is slotted into the medal slot 104 to fall or move with rotation. The medal passage 105 is formed within the main body 103, and has a slit-like sectional shape approximately similar to the medal slot 104. As shown in FIG. 1, the medal passage 105 includes a vertical medal passage 105V descending vertically from the medal slot 104 and a slope medal passage 105S sloping rightward and obliquely downward on a downstream side of the vertical medal passage 105V. Therefore, after a medal M which has been slotted into the medal slot 104 falls vertically in the vertical medal passage 105, it is guided by a guide rail 108. As shown in FIG. 1, the guide rail 108 has a guide surface 108*a* formed along a guide line GL, and slopes toward a direction of movement with rotation of the medal M such that a front portion thereof becomes lower. Therefore, the medal M is guided to a right side by the guide rail 108 to move with rotation on the guide surface 108*a* of the guide rail 108 and move in the slope medal passage 105S. In other words, in the slope medal passage 105S, the peripheral surface of the medal M comes in contact with the guide rail 108 via the guide line GL and is guided to the right side along the guide line GL while being supported by the guide rail 108. Incidentally, it is also possible to use a member having a shape other than a flat-plate shape as the guide rail 108, and the guide rail 108 may be constituted of a rod-shaped member. In this case, the medal M moves with rotation on the guide line GL such that the peripheral surface thereof is supported by the guide rail 108, while being leaning on a guide surface 103*a* formed on the main body 103 within the slope medal passage 105S.

The sorting gate 106 has a sorting plate 109 arranged so as to be capable of advancing into and retreating from the slope medal passage 105S. When the sorting plate 109 advances into the slope medal passage 105S, it causes the medal M moving with rotation to deviate from on the guide rail 108 to fall, thereby returning the medal M to the medal return slot 101. When the sorting plate 109 has retreated from the slope medal passage 105S, the medal M moves with rotation on the guide rail 108 to pass through the sorting gate 106. The sorting plate 109 advances into the slope medal passage 105S according to a gate control signal GCS from the controller 140. Incidentally, the sorting plate 109 is generally held in such a state that it has advanced into the slope medal passage 105S (namely, a state where the sorting gate 106 has been closed).

The two-dimensional imaging device 120 has a function of taking an image of one surface of the medal M moving in the medal passage 105 in a two-dimensional fashion. The two-dimensional imaging device 120 includes a light source 121, a half mirror 122, a converging lens 123, and an area image sensor 124.

The light source 121 has a function of projecting, via the half mirror 122, light on one surface of the medal M moving in the medal passage 105. The light source 121 is, for example, a surface floodlight 130. By using the surface floodlight 130, image-taking without being affected by shadow is possible even if a rotation phase of the medal M is different. The surface floodlight 130 includes a light-emitting diode (hereinafter, called "LED") 131, a light guide plate 132, a reflecting sheet 133, and a diffusing sheet 134.

Figure 2:
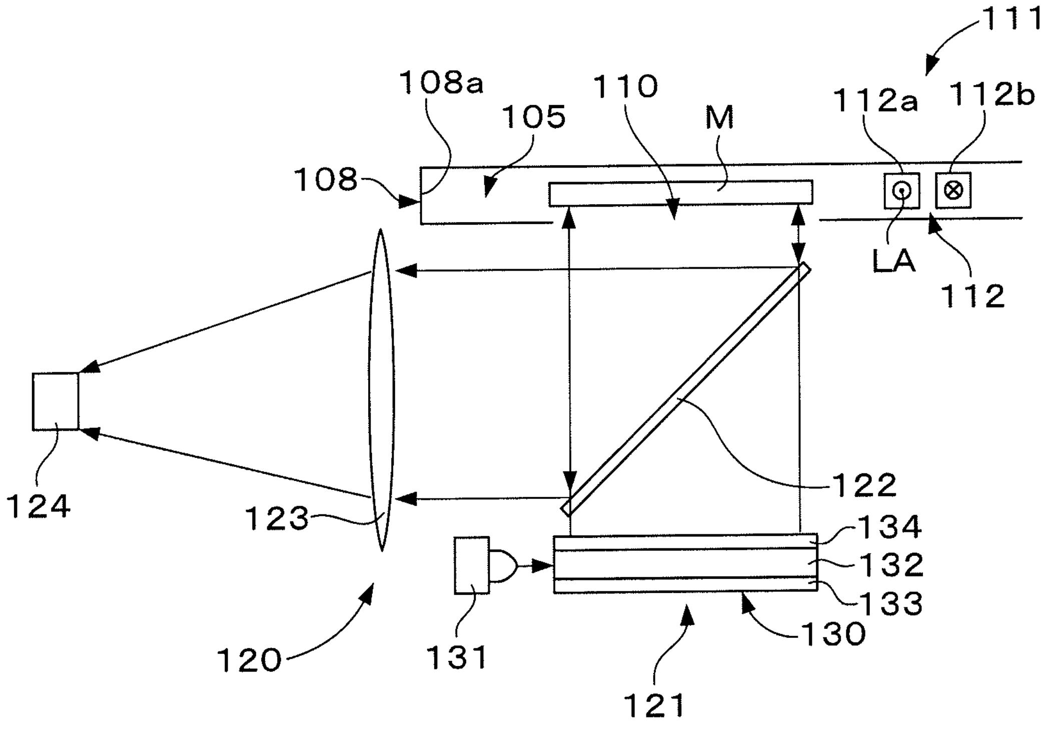
FIG. 2 is a schematic sectional view of the medal sorting device shown in FIG. 1 taken along line II-II.

The LED 131 is a light source for projecting light on the medal M. As the LED 131, an LED emitting three colors is used and the LED 131 performs irradiation of white visible light. However an LED emitting white color may be also used as the LED 131. As shown in FIG. 2, since the LED 131 is arranged so as to face a side end face of the light guide plate 132, it can be arranged within a plane parallel to the medal passage 105, so that an installation space is small. Incidentally, the position of the LED 131 shown in FIG. 2 is illustrated for convenience.

In this embodiment, the light guide plate 132 has a rectangular thin plate shape manufactured from resin for cost reduction, and it is arranged such that a surface thereof is parallel to the medal passage 105. The resin exhibits transparency or milk white due to mixing with diffusing material. When the diffusing material is mixed in the resin, the diffusing sheet 134 becomes unnecessary. The light guide plate 132 may be made of a glass substrate. In this embodiment, the light guide plate 132 is opposed to the imaging window 110.

The reflecting sheet 133 has a function of preventing light from diffusing from the light guide plate 132 to the opposite side of the medal passage 105 and reflecting light to the side of the medal passage 105. The reflecting sheet 133 is brought in close contact with a surface of the light guide plate 132 positioned on the opposite side of the medal passage 105. Incidentally, a silver film may be deposited on the light guide plate 132 instead of the reflecting sheet 133.

The diffusing sheet 134 has a function of diffusing light projected from a surface of the light guide plate 132 positioned on the side of the medal passage 105 in a surface uniform fashion. Therefore, projected light from the LED 131 which has been guided by the light guide plate 132 or has reflected by the reflecting sheet 133 is changed to a uniform light amount over a whole surface of the diffusing sheet 134 by the diffusing sheet 134 to be projected toward the medal passage 105. Thereby, uniform light is projected to the medal M. The projected light projected from the diffusing sheet 134 is projected at a right angle to the medal passage 105, namely, the medal M moving in the medal passage 105. This is performed in order to prevent optical shadow from being formed due to concavity and convexity of a surface of the medal M. Since the light guide plate 132, the reflecting sheet 133, and the diffusing sheet 134 are thin, the light source 121 can be made small in size.

The half mirror 122 has a function of reflecting a portion of light and causing a portion of the light to pass through the half mirror 122. Specifically, the half mirror 122 has a function of causing projected light from the light source 121 to pass through the half mirror 122 and reflecting reflected light from the medal M. In other words, the half mirror 122 projects projected light from the light source 121 at a right angle to the medal M in the medal passage 105 and reflects reflected light from the medal M in a direction parallel to the medal passage 105. In this embodiment, the half mirror 122 is a member obtained by applying deposition plating of chromium to a thin transparent resin. This is for achieving cost reduction. However, chromium may be plated to a glass plate. The half mirror 122 is arranged in a sloping manner at an angle of 45° to a surface of the medal passage 105 laterally to the imaging window 110 such that it is further positioned to the left downward according to separation from the medal passage 105. Specifically, the half mirror 122 slopes at an angle of 45° to the medal passage 105 in a left lower region of the slope medal passage 105S. A longitudinal axis LL of the half mirror 122 is arranged in a direction sloping at a predetermined angle to an advancing line DL (since the advancing line faces the slope medal passage 105S, it is a slightly-sloping horizontal line) of the medal M in the medal passage 105.

The converging lens 123 has a function of collecting light which has been reflected by the half mirror 122 in a predetermined small range. The converging lens 123 is a convex lens having a predetermined refractive index in view of the above function, and it is arranged on the left side of the half mirror 122 within the main body 103 and has a diameter equal to or less than that of the half mirror 122. It is preferred that the converging lens 123 is made small in size by devising the shape of the light source 121 or the like. This is for achieving cost reduction and size reduction.

The area image sensor 124 has a function of taking an image formed by collecting light by the converging lens 123. The area image sensor 124 is arranged to the left side of the converging lens 123. As the area image sensor 124, a CCD image sensor or a CMOS image sensor is adopted in order to achieve size reduction.

The timing sensor to take images 111 has a function of detecting a timing at which the medal M moving with rotation in the medal passage 105 faces the imaging window 110. The timing sensor to take images 111 is arranged in the slope medal passage 105S downstream of the imaging window 110 and is arranged such that the timing sensor to take images 111 can detect the medal M when the center of the medal M has arrived above the longitudinal axis LL of the half mirror 122 (in other words, on a base line BL described later). Therefore, the timing sensor to take images 111 outputs a timing signal TS indicating a timing at which the medal M can be imaged optimally as a detection output of the medal M.

It is preferred that use a sensor of a photoelectric type which can detect the position of the medal M accurately is used as the timing sensor to take images 111. In this embodiment, the timing sensor to take images 111 is a photoelectric sensor 112 including a light emitter 112_a_, a light receiver 112_b_, and a prism 112_c_. The light emitter 112_a_, the light receiver 112_b_, and the prism 112_c_ are arranged such that light emitted from the light emitter 112_a_ enters the light receiver 112_b_ via the prism 112_c_, and such a configuration is adopted that light emitted from the light emitter 112_a_ is blocked by the medal M, thereby detecting passing of the medal M. In other words, a detection axis DAL for detecting the medal M is formed of an axis of light emitted from the light emitter 112_a_ (namely, a light axis LA), and the medal M is detected by movement of the peripheral surface of the medal M across the detection axis DAL.

It is preferred that the detection axis DAL is disposed in a direction approximately orthogonal to the advancing line DL of the medal M as viewed in a direction orthogonal to the imaging window 110 (in a direction from a surface side of the plane of paper of FIG. 1 toward a back surface thereof). In other words, it is preferred that the detection axis DAL is disposed in a direction approximately orthogonal to the guide line GL of the guide rail 108 in the slope medal passage 105S. Thereby, the detection axis DAL passes across the slope medal passage 105S by the most direct way, and the timing sensor to take images 111 can be installed in the most efficient way. That is, since a region required for installation of the timing sensor to take images 111 becomes minimum, as viewed from a direction orthogonal to the guide line GL, such a merit can be obtained that the medal sorting device 100 can be made small in size. However, an angle of the detection axis DAL to the guide line GL is not limited to 90°, but it can be set properly in response to the shape of the medal passage 105 or the arrangement of the timing sensor to take images 111.

Incidentally, the light receiver 112*b* of the timing sensor to take images 111 can be arranged at a position opposed to the light emitter 122*a* via the slope medal passage 105S. In this case, the prism 122*c* becomes unnecessary.

Figure 3:
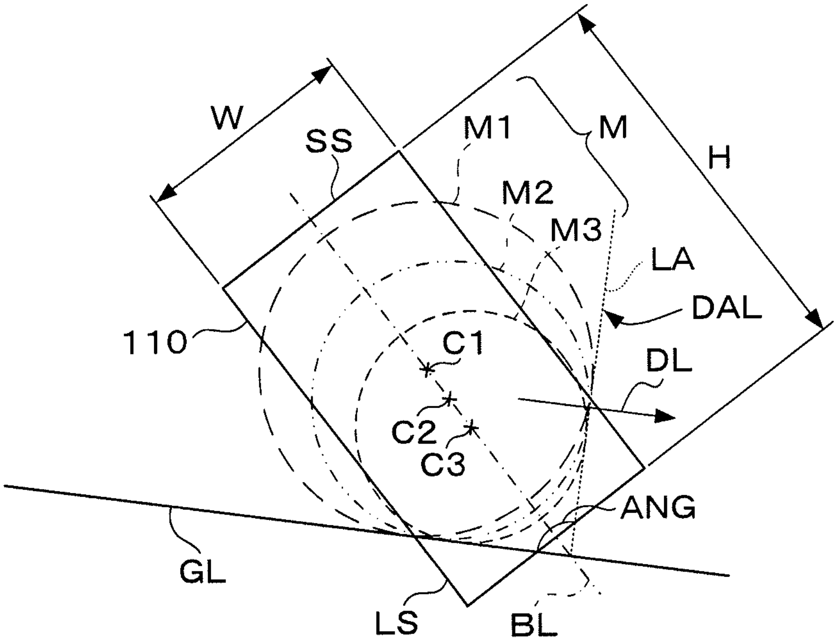
FIG. 3 is an illustrative diagram showing a state when a timing sensor to take images constituting the medal sorting device shown in FIG. 1 detects medals having different in diameter.

The imaging window 110 is composed of a rectangular opening in plan view provided in one side wall of the slope medal passage 105S, and it has a function of defining an image-taking region of the medal M moving with rotation in the slope medal passage 105S. As shown in FIG. 3, the height H (in other words, the length of the long side LS) of the imaging window 110 is formed so as to have a width wider than the diameter of a medal M1 with the greatest diameter to be sorted. This is for acquiring information about the diameter of the medal M in the vertical direction. The width W of the imaging window 110 (in other words, the length of the short side SS) is formed to be slightly smaller than the diameter of the medal M3 with the smallest diameter to be sorted. This is for preventing the medal M moving with rotation from deviating from the slope medal passage 105S, restricting the size of the half mirror 122 in a lateral direction thereof, restricting a separation amount of the half mirror 122 arranged in a sloping fashion at an angle of 45° to the medal passage 105, and reducing the size of the device. However, the width W of the imaging window 105 can be made larger than the diameter of the medal M by providing another flying-off preventing means. Incidentally, the imaging window 110 may have a shape other than the rectangular shape, but the rectangular shape which allows effective use of the imaging area of the area image sensor 124 is desirable. This is because the area image sensor 124 generally has a rectangular effective imaging area.

When a bisector of an angle ANG between the guide line GL of the guide rail 108 and the detection axis DAL of the timing sensor to take images 111 as viewed in a direction orthogonal to the imaging window 110 is adopted as a base line BL, the imaging window 110 is disposed such that the long side thereof becomes parallel to the base line BL. In other words, the imaging window 110 extends along the base line BL. Incidentally, the longitudinal axis LL of the half mirror 122 is parallel to the base line BL, and is disposed so as to be separated from the base line BL in a direction orthogonal to the imaging window 110 by a predetermined distance. In other words, the longitudinal axis LL and the base line BL overlap with each other as viewed from the direction orthogonal to the imaging window 110.

The medal counting sensor 113 has a function of detecting the medal M which has passed through the sorting gate 106. The medal counting sensor 113 is arranged at an end portion of the slope medal passage 105S downstream of the sorting gate 106, and one or plural medal counting sensors are provided. In this embodiment, one medal counting sensor 113 is provided. The medal counting sensor 113 outputs a medal detection signal DS detecting a medal M which has been judged as a true medal TM. Thereby, by counting the number of the medal detection signals DS, the number of true medals TM which have been received can be discriminated. As the medal counting sensor 113, a sensor of a photoelectric type or a magnetic type is used. In this embodiment, the medal counting sensor 113 is a photoelectric sensor 114 including a light emitter 114*a*, a light receiver 114*b*, and a prism 114*c* like the timing sensor to take images 111. The light emitter 114*a*, the light receiver 114*b*, and the prism 114*c* are arranged such that light emitted from the light emitter 114*a* enters the light receiver 114*b* via the prism 114*c*, and such a configuration is adopted that light emitted from the light emitter 114*a* is blocked by the medal M, thereby detecting passing of the medal M.

The controller 140 has a function of controlling operations of the area image sensor 124 and the LED 131 based upon the timing signal TS outputted from the timing sensor to take images 111, and receiving an image signal IS outputted from the area image sensor 124 to discriminate authenticity of the medal M and controlling opening and closing of the sorting gate 106 based upon the judgement result to sort the medal M moving with rotation in the medal passage 105. Further, the controller 140 also has a function of counting the number of medals which have been discriminated as true medals TM based upon the medal detection signals DS outputted from the medal counting sensor 113. The controller 140 is composed of, for example, a microcomputer 141 running based upon a predetermined program. The controller 140 includes an image processor 160 performing various image processing. The details of the image processor 160 will be described later in detail.

Figure 4:
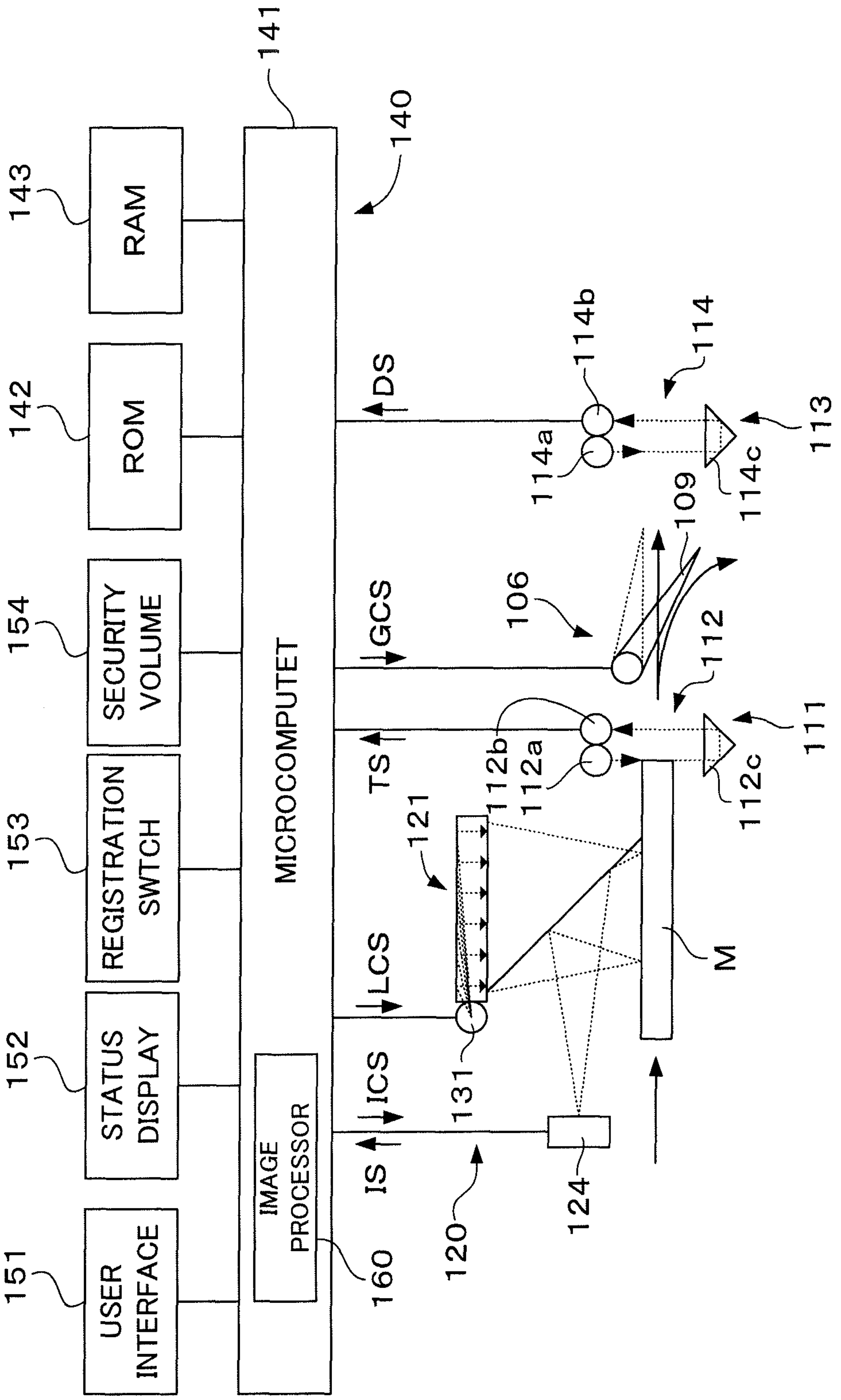
FIG. 4 is a schematic configuration diagram of the medal sorting device shown in FIG. 1.

The ROM 142 is a programmable ROM such as EEPROM (Electrically Erasable and Programmable Read Only Memory). The ROM 142 has a function of storing a program for operating the controller 140 and data. As shown in FIG. 4, the ROM 142 includes a reference image storage 171 which stores reference images described later.

The RAM 143 has a function of temporarily storing data required during operation of the controller 140. As shown in FIG. 4, the RAM 143 includes a taken image storage 172 which stores taken images of the medals M which have been taken by the area image sensor 124, and a processed image storage 173 which stores images produced in the image processor 160.

The user interface 151 has a function of performing electrical connection to such a main body device (not shown) as a game machine in which the medal sorting device 100 is incorporated. By connecting the main body device to the medal sorting device 100 via the user interface 151, inputting and outputting of a desired signal to the main body device are made possible.

The status display 152 has a function of displaying an operation status of the medal sorting device 100. The status display 152 is composed of, for example, a plurality of LEDS (not shown) having different emission colors, and light emissions of these LEDS are controlled by the controller 140 so that various statuses of the medal sorting device 100 (for example, normal operation, error generation, and the like) are notified. Incidentally, as the status display 152, a display device such as a liquid crystal panel can be used.

The registration switch 153 is used for registration of reference images described later and it has a function of instructing the start and the termination of registration to the controller 140.

The security volume 154 has a function of setting a reference value for discriminating a false medal FM in the medal sorting device 100. The controller 140 discriminates authenticity of the medal M based upon the reference value which has been set by the security volume 154.

Next, the image processor 160 will be described with reference to FIG. 4. The image processor 160 includes a center extractor 161, an edge enhancer 162, a binanization processor 163, an expansion and contraction processor 164, a size converter 165, an image rotator 166, an image movement processor 167, and a discriminator 168.

The center extractor 161 has a function of extracting the center position of the medal M in the taken image based upon the taken image stored in the taken image storage 172 of the RAM 143. In other words, the center extractor 161 calculates coordinate values indicating the center of the medal M in the taken image. As described later, since the center of the medal M is positioned on the base line BL, one and the other of the peripheral edge portions of the medal M on a straight line corresponding to the base line BL on the taken image are detected, a midpoint between both the peripheral edge portions is adopted as the center position of the medal M. Incidentally, a known method can be adopted for extraction of the center position. For example, regarding respective lines extending in a vertical axis (Y axis) on the taken image, one and the other of the peripheral edge portions of the medal M are detected, and a midpoint between both the peripheral edge portions on a line having the maximum distance between both the peripheral edge portions is adopted as the center position of the medal M. However, the method for extracting the center position on the base line BL is considerably simpler and easier than the above known method, and it can shorten the time required for extraction of the center position.

The edge enhancer 162 has a function of enhancing an edge on the taken image stored in the taken image storage 172. The term "edge enhancing" is a processing for making a concentration slope of a contour portion of an image steep to sharpen the image. The edge enhancing can be performed by subtracting a secondary differentiation from the original image (Laplacian filter) or an unsharp mask.

The binarization processor 163 has a function of binarizing the taken image which has been edge-enhanced by the edge enhancer 162. The term "binarization" is a processing for converting a gray image into a binary image. In the binarization, when a pixel value (namely, luminance) is equal to or more than a predetermined threshold value, the pixel value is set to "1", and otherwise, the pixel value is set to "0".

The expansion and contraction processor 164 has a function of repeatedly performing an expanding processing for, if at least one white pixel is present around an interesting pixel in the taken image which has been binarized in the binarization processor 163, replacing pixels around the interesting pixel with white pixels and a contracting processing for, if at least one black pixel is present around the interesting pixel therein, replacing pixels around the interesting pixel with black pixels. By performing the expanding processing and the contracting processing repeatedly, noises are removed from the binarized taken image and a pattern defect (especially, linear pattern defect) is repaired.

The size converter 165 has a function of reducing an image size of the taken image which has been expanded and contracted by the expansion and contraction processor 164. The size conversion is performed by using known affine transformation at a predetermined reducing ratio based upon a coordinate origin (X=0 and Y=0).

The image rotator 166 has a function of rotating the taken image which has been size-converted by the size converter 165. The term "rotating" is performed by using the known affine transformation at a predetermined rotation angle based upon the center position of the medal extracted by the center extractor 161.

The image movement processor 167 has a function of translating the taken image which has been size-converted by the size converter 165. The term "translating" is performed using the known affine transformation in a predetermined direction and with a predetermined moving distance. In other words, the whole image is moved based upon a moving distance (for example, one pixel in X-axis direction and zero pixel in Y-axis direction) in the X-axis direction and in the Y-axis direction, shown by the pixel.

Incidentally, if the image processor 160 has the respective functions of the center extractor 161, the edge enhancer 162, the binanization processor 163, the expansion and contraction processor 164, the size converter 165, the image rotator 166, the image movement processor 167, and the discriminator 168, it may be composed of either of hardware and software. It is possible that a portion of the image processor 160 is composed of hardware and the remaining portion thereof is composed of software. In this embodiment, the whole image processor 160 is composed of hardware advantageous for increasing a processing rate.

In the medal sorting device 100 having the above configuration, the medal M moves obliquely downward along the guide line GL in the slope medal passage 105S while being supported by the guide rail 108, and it is detected as arrival of the medal M at the predetermined position (namely, the image-taking position) in the imaging window 110 when the peripheral surface of the medal M positioned on the side of the advancing direction has been positioned on the detection axis DAL of the timing sensor to take images 111 (namely, the light axis LA of the photoelectric sensor 112). Therefore, when the medal M has arrived at the image-taking position, the peripheral surface of the medal M is positioned on the detection axis DAL regardless of the diameter of the medal M. On the other hand, since the peripheral surface of the medal M is guided along the guide line GL by the guide rail 108, the peripheral surface of the medal M is positioned on the guide line GL when the medal M has arrived at the image-taking position. That is, as shown in FIG. 3, respective peripheries of a maximum-diameter medal M1, a middle-diameter medal M2, and a minimum-diameter medal M3 are in contact with the detection axis DAL and the guide line GL as viewed from the direction orthogonal to the imaging window 110. This means that the centers C1, C2, and C3 of the medals M1, M2, and M3 are positioned on a bisector of an angle between the guide line GL and the detection axis DAL. Therefore, by using the bisector as the base line BL and extending the imaging window 110 along the base line BL, even regarding a medal M having a different diameter, a whole pattern formed on one surface thereof can be image-taken easily and securely. Thereby, easy and secure discrimination and sort can be made possible. In other words, since the diameter range of the medal M whose whole pattern can be image-taken is expanded, the diameter range which can be discriminated and sorted is expanded. In addition, regarding the direction orthogonal to the base line BL as viewed in a direction orthogonal to the imaging window 110, since the width W of the imaging window 110 can be set even regarding a medal M having a different diameter without considering the movement of the center of the medal M, the width W of the imaging window 110 can be made relatively small. In other words, unlike the conventional device described above, it is unnecessary to increase the image-taking region according to shift or error of the center position of the medal M. Therefore, the medal sorting device 100 can be made small in size. Furthermore, since a plurality of timing sensors to take images 111 are not required, low reduction can be achieved, complicated adjustment is not required, and easy realization can be achieved. Further, when the center position of the medal M serving as a reference for image discrimination is obtained, since the center position is present on the base line BL, extraction of the center position is simple and easy, and the processing time required for discrimination is shortened. In other words, the time required for sorting is shortened, so that faster sorting is made possible.

The shape of the imaging window 110 is a rectangle having the long sides LS and the short sides SS, and the imaging window 110 is arranged such that the long side LS of the rectangle becomes approximately parallel to the baseline BL. Since the area image sensor 124 generally has a rectangular effective imaging area, the utilization efficiency of the imaging area in the area image sensor 124 can be improved by making the imaging window 110 rectangular.

The imaging window 110 is arranged such that it is made symmetrical about the base line BL as viewed from the direction orthogonal to the imaging window 110. In other words, the imaging window 110 is arranged such that the central axial line in the short side direction of the imaging window 110 overlaps with the base line BL. Thereby, if a time difference from detection of the medal M performed by the timing sensor to take images 111 up to image-taking of the medal M performed by the area image sensor 124 falls within a substantially negligible range, the center of the medal M is disposed at the center of the imaging window 110 in a direction of the short side of the rectangle, so that the whole pattern can be image-taken efficiently.

The photoelectric sensor 112 is used as the timing sensor to take images 111, and the light axis LA of the photoelectric sensor 112 forms the detection axis DAL. Therefore, since the medal M is detected by light with high directionality and linearity, detection accuracy can be improved.

(Operation)

Next, the operation of the medal sorting device 100 will be described with reference to FIG. 6 to FIG. 12. Processing performed by the controller 140 will be mainly described below.

Figure 6:
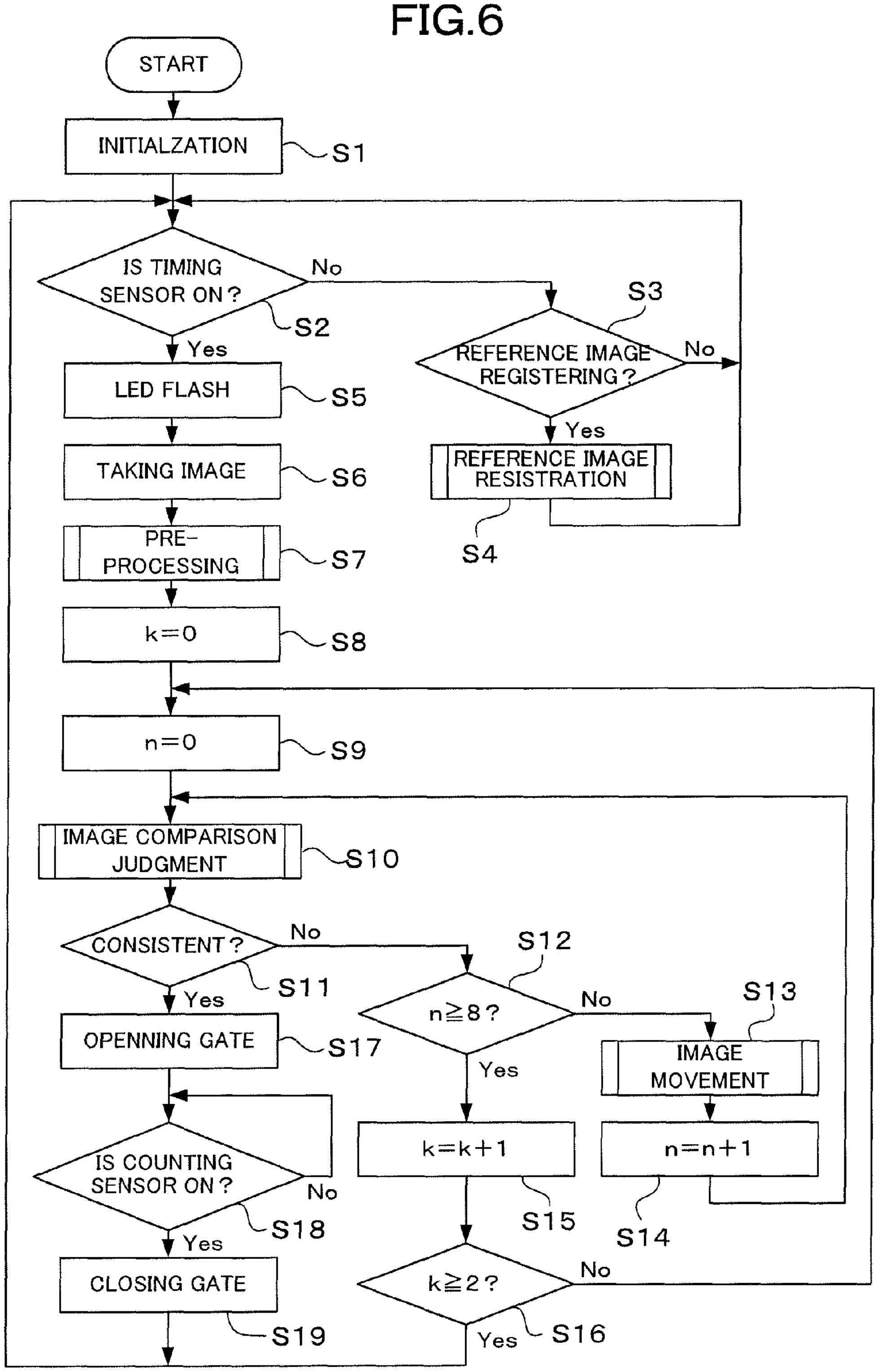
FIG. 6 is a flowchart for explaining an operation of the medal sorting device shown in FIG. 1.

First, as shown in FIG. 6, at step S1, initialization is performed. In the initialization, a frame rate of the area image sensor 124, sensitivities of the timing sensor to take images 111 and the medal counting sensor 113, and the like are set.

At the next step S2, whether or not the timing sensor to take images 111 has been turned on is judged. In other words, whether or not the medal M moving with rotation in the medal passage 105 has arrived at the image-taking position is judged. When the timing sensor to take images 111 is off, the control proceeds to step S3, while the control proceeds to step S5 when the timing sensor to take images 111 is on.

At step S3, whether or not the reference image is registered is judged. That is, whether or not the registration switch 153 has been turned on is judged. When the registration switch 153 is on, the control proceeds to step S4, while the control returns to step S2 when the registration switch 153 is off.

When a medal M has been slotted into the medal slot 104, after the slotted medal M has fallen in the vertical medal passage 105V, it moves with rotation in the slope medal passage 105S to turn on the timing sensor to take images 111. That is, the timing sensor to take images 111 is turned on in response to slotting of the medal M into the medal slot 104. When the medal M is not slotted into the medal slop 104 and the registration switch 153 is not turned on, step S2 and step S3 are performed repeatedly. In other words, a waiting state is maintained until one of slotting of the medal M and turning-on of the registration switch 153 has been performed.

Figure 7:
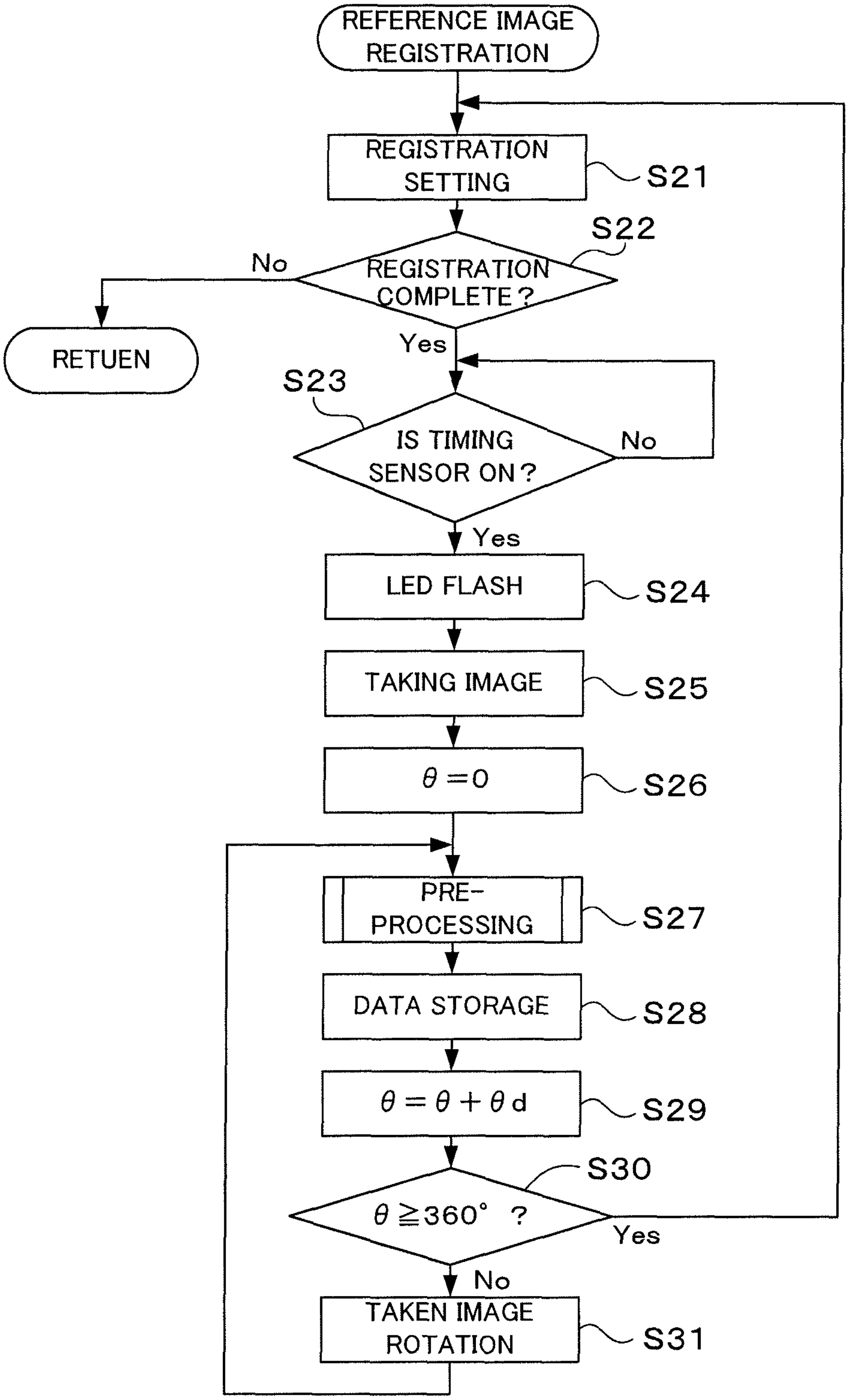
FIG. 7 is a flowchart showing details of a reference image registering step shown in FIG. 6.

At step S4, registration of the reference image is performed according to respective steps shown in FIG. 7. The registration of the reference image is performed by acquiring images of a surface and a back surface of a medal serving as a reference for discrimination of authenticity (hereinafter, called “reference medal SM”). It is preferred for increasing discrimination accuracy that an unused medal M is used as the reference medal SM, but a used medal M may be used. In the reference image registration in FIG. 7, registration setting is performed at first step S21. In the registration setting, for example, selection about whether an image to be registered is a surface of a medal M or a back surface thereof is made.

At the next step S22, whether the registration has been completed is judged. The registration completion is judged based upon whether or not the registration switch 153 has been turned off. When the registration switch 153 has been turned off, the control returns to step S4 shown in FIG. 6, while the control proceeds to step S23 when the registration switch 153 is not turned off.

At the next step S23, whether or not the timing sensor to take images 111 has been turned on is judged like the above step S2. When a reference medal SM has been slotted into the medal slot 104 and the timing sensor to take images 111 has been turned on, the control proceeds to step S24. When the timing sensor to take images 111 is off, step S23 is performed repeatedly. In other words, a waiting state is maintained until the reference medal SM is slotted in the medal slot 104.

At the next step S24, the controller 140 outputs a lighting control signal LCS to the LED 131 so that the LED 131 is lightened for a short time (namely, flashed) based upon the lighting control signal LCS. Thereby, diffusion light from the light source 121 toward the imaging window 110 is emitted, so that the reference medal SM opposed to the imaging window 110 is irradiated with the light.

Figure 5:
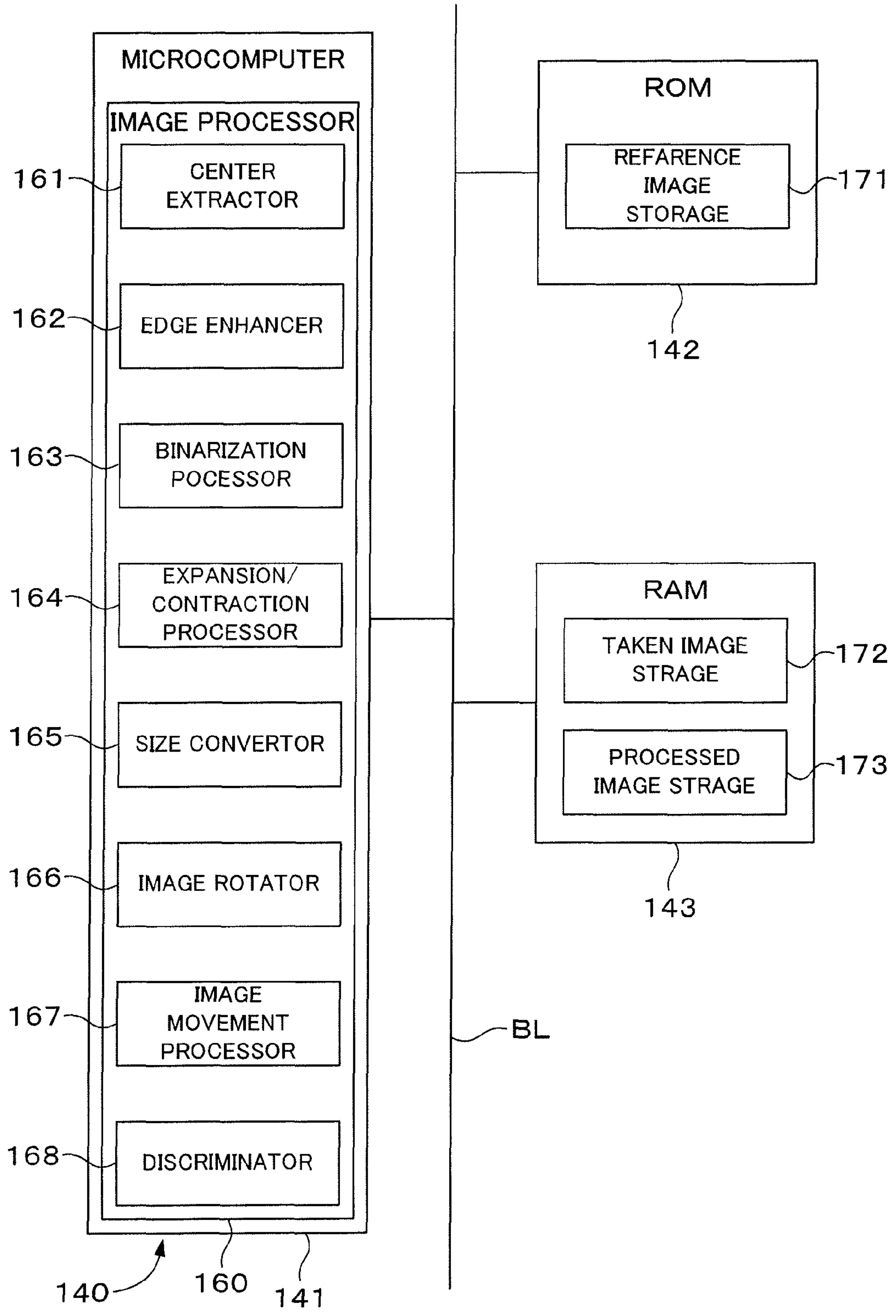
FIG. 5 is a block diagram showing an image processor of the medal sorting device shown in FIG. 1.

At the next step S25, the controller 140 outputs an imaging control signal ICS to the area image sensor 124 so that the area image sensor 124 takes an image of the reference medal SM based upon the imaging control signal ICS. The area image sensor 124 outputs an image signal IS including an acquired taken image to the controller 140. The controller 140 forwards the taken image included in the supplied image signal IS to the RAM 143 via a bus line BS shown in FIG. 5. The RAM 143 stores and holds the forwarded taken image in the taken image storage 172.

At the next step S26, “0” is set in the rotation angle θ. In other words, the rotation angle θ is initialized (namely, reset).

Figure 8:
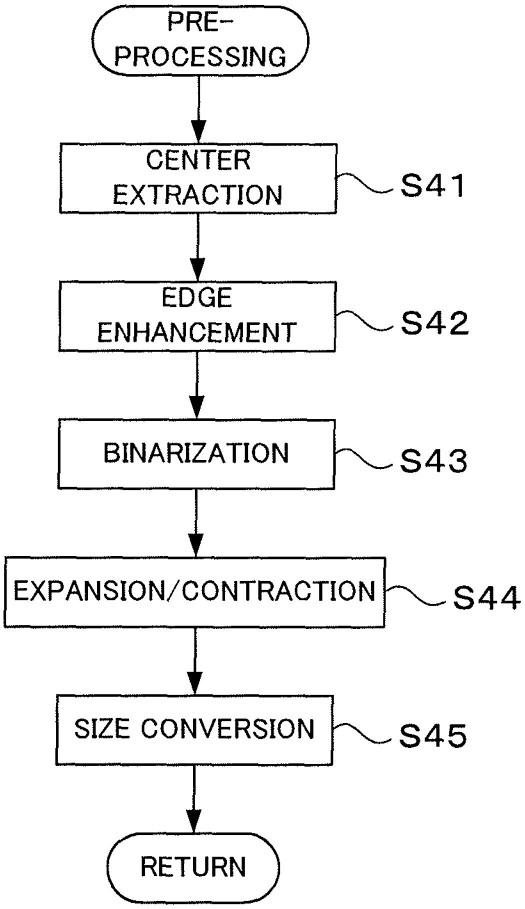
FIG. 8 is a flowchart showing details of a pre-processing step shown in FIG. 6.

At the next step S27, the image processor 160 in the controller 140 performs pre-processing to the taken image stored in the taken image storage 172. As shown in FIG. 8, the pre-processing is performed in the order of the center extraction, the edge enhancement, the binarization, the expansion/contraction, and the size conversion. First, at step S41, the center extractor 161 extracts the center position of the reference medal SM on the taken image stored in the taken image storage 172. A coordinate value of the extracted center position is stored in the RAM 143.

At the next step S42, the edge enhancer 162 performs processing for edge enhancement to the taken image stored in the taken image storage 172. The taken image which has been edge-enhanced is stored in the processed image storage 173 in the RAM 143.

At the subsequent step S43, the binanization processor 163 binarizes the edge-enhanced taken image which has been stored in the processed image storage 173. The binarized taken image is stored in the processed image storage 173.

Thereafter, at step S44, the expansion and contraction processor 164 performs expanding and contracting processing to the binarized taken image stored in the processed image storage 173. Noise removal, repair of pattern defect or the like of the binarized taken image is performed according to the expanding and contracting processing. The expanded and contracted taken image is stored in the processed image storage 173.

Further, at step S45, the size converter 165 performs size converting processing to the expanded and contracted taken image which has been stored in the processed image storage 173. The taken image which has been subjected to the expanding and contracting processing is reduced by the size converting processing so that the number of pixels is reduced. The size-converted taken image is stored in the processed image storage 173. The pre-processing is completed in this manner, and the taken image which has been subjected to the pre-processing is stored in the processed image storage 173. Thereafter, the control returns to step S27 shown in FIG. 7.

At step S28 shown in FIG. 7, data is stored in the ROM 142. That is, the taken image which has been subjected to the pre-processing is forwarded from the RAM 143 to the ROM 142 via the bus line BS, and is stored in the reference image storage 171 as a reference image with a rotation angle θ=0. In other words, the reference image is stored in the reference image storage 171 while being associated with the rotation angle θ. At this time, the taken image stored in the taken image storage 172 of the RAM 143 continues to be stored in the taken image storage 172.

At the next step S29, "θ+θd" obtained by adding a rotation angle increment θd to the current rotation angle θ is set as a new rotation angle θ. In other words, by adding the rotation angle increment θd to the rotation angle θ, the rotation angle θ is updated. In this embodiment, θd is set such that when an image has been subjected to one rotation, the total of 64 reference images including the reference image with θ=0 are obtained. The "θd" in this case is "5.625°".

At the next step S30, whether or not the rotation angle θ is equal to or more than 360° is judged. When the rotation angle θ is less than 360° (namely, "θ<360°"), after the taken image stored in the taken image storage 172 of the RAM 143 has been rotated at the set rotation angle θ at step S31, the control returns to step S27, and steps S27 to S31 are performed repeatedly. Thereby, a plurality of reference images corresponding to a plurality of rotation angles θ, respectively, is stored and held in the reference image storage 171 of the ROM 142. In other words, the taken image of the reference medal SM and a plurality of reference images composed of images obtained by rotating the taken image at a plurality of different rotation angles θ are held in the reference image storage 171.

At step S30, when the rotation angle θ is equal to or more than 360° (namely, "θ≥360°"), the control returns to step S21, and steps S21 to S31 are repeated. Thereby, regarding each of the surface and the back surface of the reference medal SM, a plurality of reference images can be registered.

Incidentally, in the registration of the reference images, a surface number k for specifying either of a surface and a back surface of the reference medal SM is set. That is, "0" is set to the reference images corresponding to the surface of the reference medal SM as the surface number k. Similarly, "1" is set to the reference images corresponding to the back surface of the reference medal SM as the surface number k. Then, the surface numbers k together with a plurality of reference images are stored in the reference image storage 171. Thereby, the reference image of the surface on the reference medal SM and the reference image of the back surface thereof can be discriminated from each other based upon the surface number k.

Further, when the reference images are registered, all of the center extraction, the edge enhancement, the binarization, the expansion and contraction, and the size conversion (steps S41 to S45 in FIG. 8) in the pre-processing (step S31 in FIG. 7) after the rotation of the acquired image (step S31 in FIG. 7) are performed, but the processing of the center extraction, the edge enhancement, the binarization, and the expansion and contraction can be omitted in the pre-processing. That is, in the case of "θ=0" (in other words, the case of a non-rotated image), the processed image (in other words, the processed image before the size conversion) after the center extraction, the edge enhancement, the binarization, and the expansion and contraction have been performed at step S27 is held in the RAM 143 and the size conversion is then performed, and in the case of "0<θ<360°", the processed image before the size conversion which has been held in the RAM 143 at step S31 is rotated and only the size conversion can be performed at step S27 performed subsequently. Thereby, the time required for registration of the reference images can be shortened.

Here, explanation returns to FIG. 6. When a medal M to be sorted (in other words, an object to be discriminated) is slotted into the medal slot 104 and the timing sensor to take images 111 is turned on at step S4, the controller 140 outputs a lighting control signal LCS to the LED 131 so that the LED 131 is lightened for a short time (namely, flashed) based upon the lighting control signal LCS at step S5 like step S24 shown in FIG. 7. Thereby, diffusion light from the light source 121 toward the imaging window 110 is emitted so that the medal M to be sorted opposed to the imaging window 110 is irradiated with the light.

At the next step S6, the controller 140 outputs an imaging control signal ICS to the area image sensor 124 so that the area image sensor 124 takes an image of the medal M based upon the imaging control signal ICS like step S25 shown in FIG. 7. The area image sensor 124 outputs an image signal IS including the acquired taken image to the controller 140. The controller 140 stores and holds the taken image included in the supplied image signal IS in the taken image storage 172 in the RAM 143.

Incidentally, the taken image acquired at step S6 is an image of either of the surface or the back surface of the medal M to be sorted. Therefore, when patterns formed on the surface and the back surface of the medal M are different from each other, it is necessary to compare these patterns with the respective reference images on the surface and the back surface of the reference medal SM. In this embodiment, assuming that the patterns formed on the surface and the back surface of the medal M are different from each other, explanation is made.

At the next step S7, the pre-processing is performed in the order of the center extraction, the edge enhancement, the binarization, the expansion and contraction, and the size conversion at steps S41 to S45 shown in FIG. 8 like step S27 shown in FIG. 7. At this time, the taken image which has been subjected to the pre-processing is held in the processed image storage 173 in the RAM 143 as a image to be discriminated. The taken image which has been held in the taken image storage 172 in the RAM 143 continues to be held in the taken image storage 172.

At the next step S8, the controller 140 sets "0" in the above-described surface number k. Thereby, at image comparison judgement (step S10), comparison with the reference image corresponding to "k=0" is first performed.

At the next step S9, the controller 140 sets "0" in an image movement count number n. In other words, the image movement count number n is initialized (namely, reset).

Figure 9:
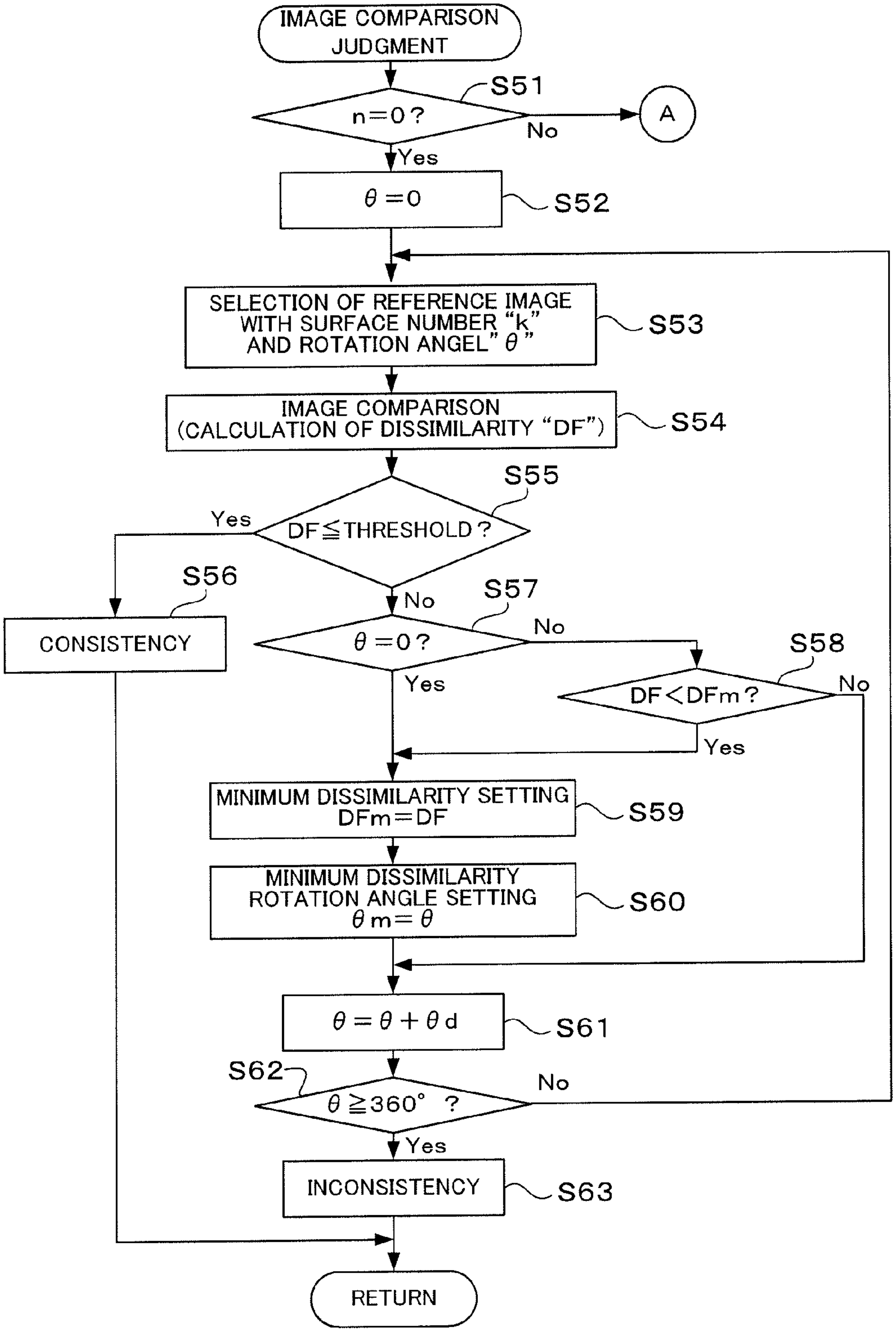
FIG. 9 is a flowchart showing details of an image comparing and judging step shown in FIG. 6.
Figure 10:
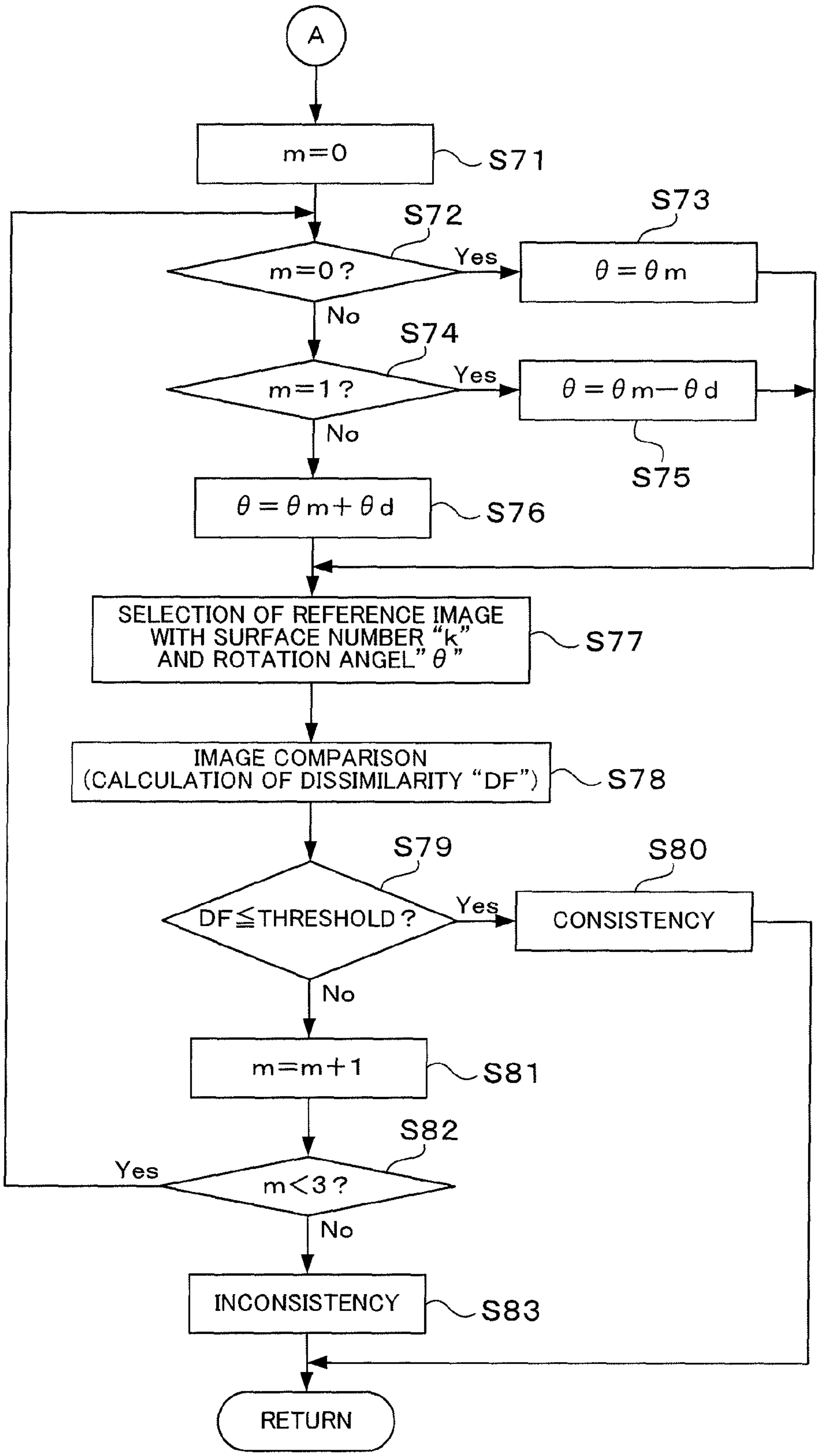
FIG. 10 is a flowchart showing details of the image comparing and judging step shown in FIG. 6 and following FIG. 9.

At the next step S10, the image comparison judgement shown in FIG. 9 and FIG. 10 is performed. At step S51 shown in FIG. 9, first, whether or not the image movement count number n is "0" is judged. In other words, at step S51, whether or not translation described later has been performed is judged. In the case of "n=0" where the translation has not been performed, the control proceeds to step S52, and in the case of "n≠0" where the translation has been performed, the control proceeds to step S71 shown in FIG. 10.

At step S52 performed in the case of "n=0", "0" is set in the rotation angle θ, and at the next step S53, the reference image having the surface number k and the rotation angle θ is selected from the plurality of reference images which have been held in the reference image storage 171 in the ROM 142. First, the reference image having "k=0, θ=0" is selected.

At the next step S54, image comparison for comparing the selected reference image and the image to be discriminated which has been held in the processed image storage 173 with each other is performed. In the image comparison, the selected reference image and the image to be discriminated are compared pixel by pixel, so that a dissimilarity DF is calculated by counting the number of pixels different in pixel value.

Incidentally, judgement can be made based upon similarity instead of the dissimilarity DF. In this case, the similarity is calculated by counting the number of pixels consistent in pixel value and when the calculated similarity is equal to or more than a predetermined threshold value, consistency can be judged.

At the next step S55, whether or not the calculated dissimilarity DF is equal to or less than a predetermined threshold value is judged. When the dissimilarity DF is equal to or less than the threshold value, after judgement of consistency has been made at step S56, the control returns to step S10 shown in FIG. 6. Otherwise, the control proceeds to step S57.

At step S57, whether or not θ is "0" is judged. In the case of "θ=0", the control proceeds to step S59, and in the case of "θ≠0", the control proceeds to step S58.

At step S59 and the next step S60, a minimum dissimilarity DFm showing the minimum value of the dissimilarity DF and a minimum dissimilarity rotation angle θm where the dissimilarity DF becomes the minimum are set. At step S59, the current dissimilarity DF is set as the minimum dissimilarity DFm, and at step S60, the current rotation angle θ is set as the minimum dissimilarity rotation angle θm. The set minimum dissimilarity DFm and minimum dissimilarity rotation angle θm are stored in the RAM 143.

At step S58 in the case of "θ≠0", whether or not the dissimilarity DF is less than the minimum dissimilarity DFm is judged. In the case of "DF<DFm", namely, when the dissimilarity DF which has been calculated at step S54 is smaller than the minimum dissimilarity DFm which has been already set, the control proceeds to step S59, and the minimum dissimilarity DFm and the minimum dissimilarity rotation angle θm are updated at steps S59 and S60. In the case of "DF≥DFm", the control proceeds to step S61, and the current minimum dissimilarity DFm and the minimum dissimilarity rotation angle θm are maintained as they are.

At the next step S61, a value obtained by adding a rotation angle increment θd to the current rotation angle θ is set as a new rotation angle θ. In other words, the rotation angle θ is updated.

At the next step S62, whether or not the rotation angle θ which has been updated at step S61 is equal to or more than "360°" is judged. In the case of "θ≥360°", judgement of inconsistency is made at step 363, and the control returns to step S10 shown in FIG. 6. In the case of "θ<360°", the control returns to step S53, and steps S53 to S62 are performed repeatedly. Thereby, the dissimilarities DF of respective ones of the plurality of reference images corresponding to the respective rotation angles θ are calculated while the rotation angle θ is increased, and judgement of either of consistency and inconsistency is made from the comparison result between the calculated dissimilarities DF and the threshold value. Incidentally, when judgement of dissimilarity has been made at step S63, the minimum dissimilarity DFm and the minimum dissimilarity rotation angle θm are established. In other words, when the judgement of inconsistency has been made, the minimum dissimilarity rotation angle θm from which the minimum dissimilarity DFm can be obtained is held in the RAM 143 regarding the plurality of reference images which has been prepared in the range of an angle θ of "0≤θ<360°".

Here, explanation returns to FIG. 6 again. At step S11, whether or not judgement of consistency has been made in the image comparison judgement at step S9 is judged. In other words, whether or not judgement of a true medal has been made is judged. When consistency has been judged (namely, when the true medal has been judged), the control proceeds to step S17, and when inconsistency has been judged, the control proceeds to step S12.

At step S17, the controller 140 outputs a gate control signal GCS to the sorting gate 106 and the sorting plate 109 is retreated from the medal passage 105 so that the sorting gate 106 is opened. Thereby, the true medal TM moving with rotation in the slope medal passage 105S passes through the sorting gate 106 to be introduced into the main body device (not shown) via the medal reception port 102. In other words, the medal M which has been slotted into the medal slot 104 is judged as the true medal TM and is sorted as the true medal TM by the sorting gate 106.

At the next step S18, whether or not the medal counting sensor 113 has been turned on is judged, and when the medal count sensor 113 is off, step S18 is performed repeatedly. In other words, the medal counting sensor 113 is put in a waiting state. When the medal M has been sorted as the true medal TM at step S17, the medal counting sensor 113 is turned on by the true medal TM which has passed through the sorting gate 106, and the control proceeds to step S19.

At step S19, after the sorting plate 109 enters the medal passage 105 so that the sorting gate 106 is closed, the control returns to step S2. Thereby, the closed state of the sorting gate 106 is maintained until the medal M is judged as the true medal at step S11, so that a false medal FM is sorted to the medal return slot 101.

At step S12 performed when inconsistency has been judged at the above-described step S11, whether or not the image movement count number n is equal to "8" or more is judged. Unless the image movement count number n is equal to "8" or more (namely, in the case of "n<8"), the control proceeds to step S13, and translation processing shown in FIG. 11 is performed.

Figure 11:
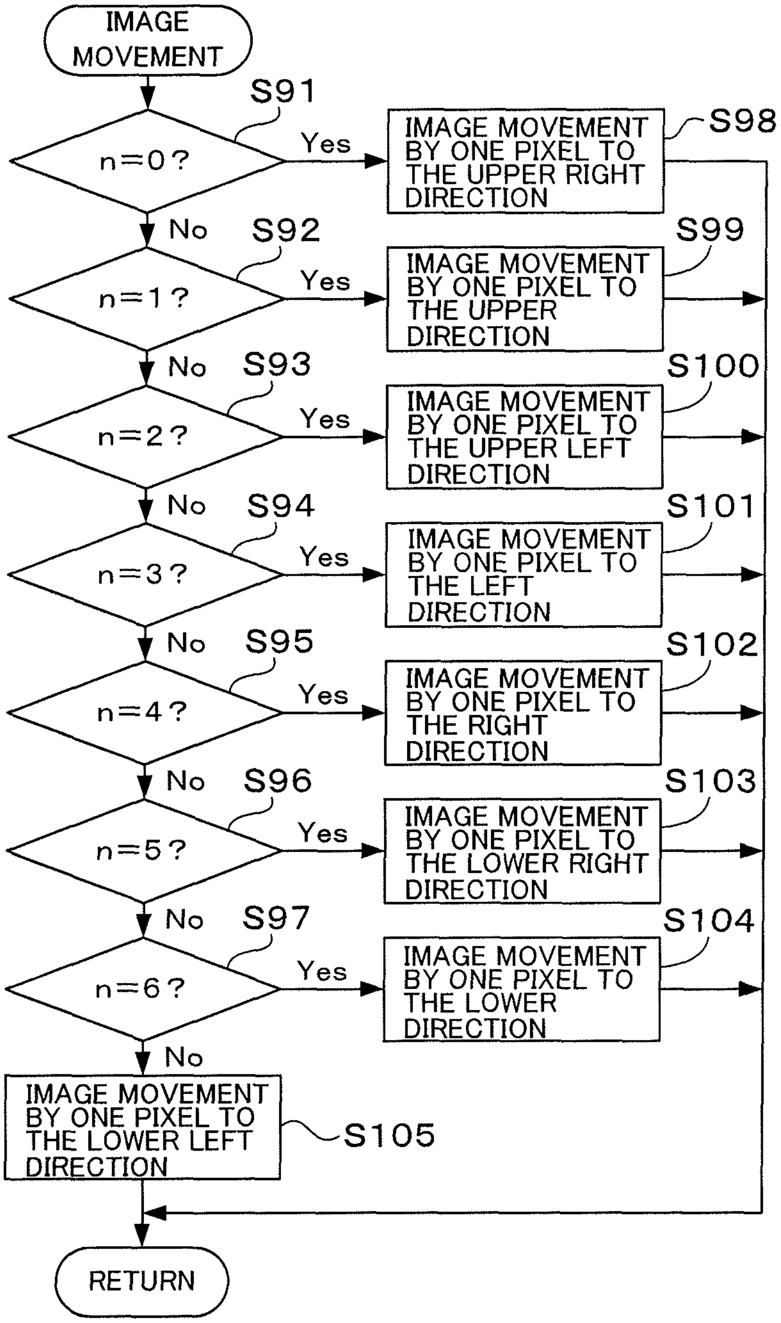
FIG. 11 is a flowchart showing details of a translating step shown in FIG. 6.
Figure 12:
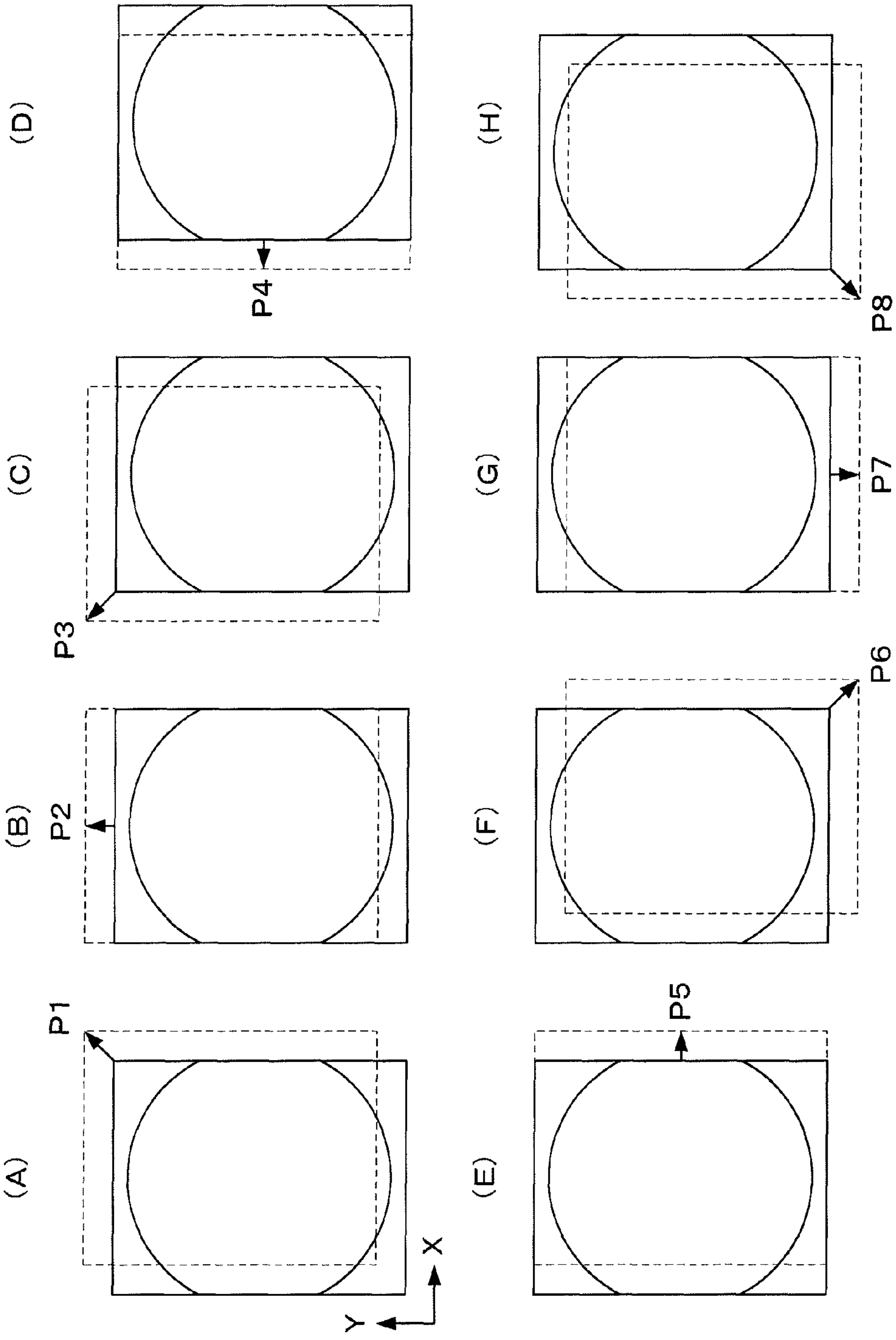
FIG. 12 is an illustrative view showing movement of a taken image at the translating step shown in FIG. 6.

In the translation processing shown in FIG. 11, the image to be discriminated which has been held in the processed image storage 173 in the RAM 143 is moved in a predetermined direction corresponding to the image movement count number n. The image to be discriminated which has been moved is held in the processed image storage 173 in the RAM 143. That is, at step S91, whether or not the image movement count number n is "0" is judged. In the case of "n=0", after the image to be discriminated has been moved rightward upward by one pixel (movement to a position P1 shown in FIG. 12(A), namely, pixel movement in the X-axis direction and the Y-axis direction by respective "+1" pixels) at step S98, the control returns to step S12 shown in FIG. 6. In the case of "n≠0", the control proceeds to step S92, and whether or not the image movement count number n is "1" is judged. In the case of "n=1", after the image to be discriminated has been moved upward by one pixel (movement to a position P2 shown in FIG. 12(B), namely, movement in the Y-axis direction by "+1" pixel) at step S99, the control returns to step S12 shown in FIG. 6. In the case of "n≠1", the control proceeds to step S93, and whether or not the image movement count number n is "2" is judged. In the case of "n=2", after the image to be discriminated has been moved leftward upward by one pixel (movement to a position P3 shown in FIG. 12(C), namely, pixel movement in the X-axis direction by "−1" and in the Y-axis direction by "+1") at step S100, the control returns to step S12 shown in FIG. 6. In the case of "n≠2", the control proceeds to step S94, and whether or not the image movement count number n is "3" is judged. In the case of "n=3", after the image to be discriminated has been moved leftward by one pixel (movement to a position P4 shown in FIG. 12(D), namely, pixel movement in the X-axis direction by "−1") at step S101, the control returns to step S12 shown in FIG. 6. In the case of "n≠3", the control proceeds to step S95, and whether or not the image movement count number n is "4" is judged. In the case of "n=4", after the image to be discriminated has been moved rightward by one pixel (movement to a position P5 shown in FIG. 12(E), namely, pixel movement in the X-axis direction by "+1") at step S102, the control returns to step S12 shown in FIG. 6. In the case of "n≠4", the control proceeds to step S96, and whether or not the image movement count number n is "5" is judged. In the case of "n=5", after the image to be discriminated has been moved rightward downward by one pixel (movement to a position P6 shown in FIG. 12(F), namely, pixel movement in the X-axis direction by "+1" and in the Y-axis direction by "−1") at step S103, the control returns to step S12 shown in FIG. 6. In the case of "n≠5", the control proceeds to step S97, and whether or not the image movement count number n is "6" is judged. In the case of "n=6", after the image to be discriminated has been moved downward by one pixel (movement to a position P7 shown in FIG. 12(G), namely, pixel movement in the Y-axis direction by "−1") at step S104, the control returns to step S12 shown in FIG. 6. In the case of "n≠6", the control proceeds to step S105, and after the image to be discriminated has been moved leftward downward by one pixel (movement to a position P8 shown in FIG. 12(H), namely, pixel movement in the X-axis direction and in the Y-axis direction by respective "−1" pixels), the control returns to step S13. Incidentally, in FIG. 12, in order to clarify the direction of the translation, the movement distance is shown largely for convenience.

After the image to be discriminated has been moved at step S13, "1" is added to the current image movement count number n and a new image movement count number n is set at step S14. After the image movement count number n has been updated in this manner, the control returns to step S10, and steps S10 to S14 are repeated until consistency is judged at step S11 or "n≥8" is judged at step S12. That is, the image to be discriminated which has been moved at step S13 is stored and held in the processed image storage 173 in the RAM 143, and image comparison judgement is performed at step S10. In other words, judgement about authenticity of the medal M based upon comparison between the image to be discriminated which has been moved and the plurality of reference images is performed repeatedly while the direction of the translation is changed.

Incidentally, here, the movement amount of the translation is set at each one pixel in 8 directions, but when an error of a pattern to the center position of a medal is large, the movement amount can be set at two pixels or more, if necessary. In this case, in the translation processing shown in FIG. 11, the number of pixels can be increased gradually by setting the image movement count number n or the number of pixels properly.

At step S10 shown in FIG. 6, when the image to be discriminated which has been moved and the plurality of reference images are compared with each other, the respective steps shown in FIG. 10 are performed. That is, since "1" has been added to the image movement count number n at step S14 shown in FIG. 6, the control proceeds to step S71 according to the judgement at step S51 shown in FIG. 9. At this step S71, "0" is set as the rotation angle count number m. The rotation angle count number m is held in the RAM 143.

At the next step S72, whether or not the rotation angle count number m is consistent with "0" is judged. In the case of "m=0", after the minimum dissimilarity rotation angle θm has been set as the rotation angle θ at step S73, the control proceeds to step S77. In the case of "m≠0", the control proceeds to step S74.

At step S74, whether or not the rotation angle count number m is consistent with "1" is judged. In the case of "m=1", after "θm−θd" obtained by subtracting a rotation angle increment θd from the minimum dissimilarity rotation angle θm has been set as the rotation angle θ at step S75, the control proceeds to step S77. In the case of "m≠1", after "θm+θd" obtained by adding the rotation angle increment θd to the minimum dissimilarity rotation angle θm has been set as the rotation angle θ, the control proceeds to step S77.

At step S77, the reference image corresponding to the rotation angle θ, which has been set at either of steps S73, S75 and S76, is selected from the plurality of reference images held in the reference image storage 171 in the ROM 142. At this time, selection is made from the plurality of reference images corresponding to the surface number k.

At the next step S78, image comparison for comparing the selected reference image and the image to be discriminated (namely, the moved image to be discriminated) held in the processed image storage 173 in the RAM 143 with each other is performed like step S54 shown in FIG. 9. In the image comparison, the dissimilarity DF is calculated by comparing the selected reference image and the image to be discriminated with each other pixel by pixel to count the number of pixels different in pixel value.

At the next step S79, whether or not the calculated dissimilarity DF is equal to or less than a predetermined threshold value is judged like step S55 shown in FIG. 9. When the dissimilarity DF is equal to or less than the predetermined threshold value, after judgement of consistency is made at step S80, the control returns to step S10 shown in FIG. 6. Otherwise, the control proceeds to step S81.

At step S81, "m+1" obtained by adding "1" to the current rotation angle counter number m is set as a new rotation angle count number m.

At the next step S82, whether or not the rotation angle count number m is less than "3" is judged. In the case of "m<3", the control returns to step S72, and steps S72 to S82 are performed repeatedly. In the case of "m≥3", after judgement of inconsistency has been made at step S83, the control returns to step S10 shown in FIG. 6.

When the moved image to be discriminated and the plurality of reference images are compared with each other in this manner, the minimum dissimilarity rotation angle θm where the minimum dissimilarity DFm can be obtained in the image to be discriminated which has not been moved is specified as a first rotation angle, the angle "θm−θd" obtained by subtracting the rotation angle increment θd from the minimum dissimilarity rotation angle θm is specified as a second rotation angle, the angle "θm+θd" obtained by adding the rotation angle increment θd to the minimum dissimilarity rotation angle θm is specified as a third rotation angle, and judgement about either of consistency and inconsistency is made by comparing the reference images corresponding to the specified first to third rotation angles and the moved image to be discriminated with each other. In other words, three reference images are specified from 64 reference images which have been held in the reference image storage 171 and comparison about only the specified three reference images is performed. Therefore, as compared with the case that comparison about all of 64 reference images is performed, the time required for judgement can be shortened.

Incidentally, though the rotation angle increment θd is set at "5.625°" and a total of 64 reference images are registered per one surface in the reference image registration shown in FIG. 7, the rotation angle increment θd can be set properly. When the number of reference images per one surface is properly increased by setting the rotation angle increment θd smaller, the image comparison about only the reference image corresponding to the first rotation angle (namely, the minimum dissimilarity rotation angle θm) can be performed in the image comparison judgement to the taken image after moved.

Explanation returns to FIG. 6 again. When the image movement count number n is equal to or more than "8" (namely, in the case of "n≥8") at step S12, the control proceeds to step S15, and "1" is added to the current surface number k, so that a new surface number k is set.

At the next step S16, whether or not the surface number k is equal to or more than "2" is judged. When the surface number k is less than "2" (namely, "k<"2"), the control returns to step S9. In other words, the processing at steps S9 to S14 is performed in the set state of "k=1" again. That is, comparison with the reference images of the back surfaces of the reference medals SM is performed.

In the case of "k≥2" at step S16, the control returns to step S2. At this time, since the closed state of the sorting gate 106 is maintained, the medal M moving with rotation in the medal passage 105 cannot pass through the sorting gate 106, so that the medal M is sorted to the medal return slot 101. In other words, the medal M is sorted as the false medal FM to be discharged from the medal return slot 101.

Incidentally, when the patterns on the surface and the back surface of the medal M are the same, application can be made possible by omitting the processing at steps S15 and S16.

Thus, when the medal M is not discriminated as the truth from comparison between the image to be discriminated and the plurality of reference images, the image to be discriminated is moved by the image movement processor 167, and authenticity of the medal M is discriminated by comparing the moved image to be discriminated and the plurality of reference images. The pattern of the medal M regarding the image to be discriminated moves relative to each of the plurality of reference images according to the translation. Therefore, if the direction and the movement amount in the translation are appropriate, a position error of the pattern in the moved image to be discriminated is corrected, and the position error is removed or reduced. The plurality of reference images is composed of the image corresponding to the reference medal SM and images obtained by rotating the image at a plurality of rotation angles different from one another. Therefore, even if the pattern of the medal M is rotated regarding the taken image, comparison with the reference image having a rotation angle identical to or close to the former rotation angle becomes possible. Therefore, influences of both the rotation and the position error of the pattern on the taken image (in other words, the image to be discriminated) can be removed or reduced, so that discrimination accuracy can be increased.

Because the plurality of reference images is prepared in advance, the processing time can be reduced as compared with the case where the image to be discriminated is rotated. Further, because the translation of the image to be discriminated is achieved by only addition or subtraction of the coordinate value, it can be performed in a relatively short time. Therefore, the time required for discrimination can be shortened and high-speed sorting can be made possible.

The discrimination of the moved image to be discriminated is performed repeatedly while the direction of the translation is changed. Therefore, correction of the position error is optimized so that sorting accuracy is further increased.

Further, in the discrimination of the moved image to be discriminated, three rotation angles θm, θm−θd, and θm+θd are specified from the plurality of rotation angles θ according to the result of comparison between the image to be discriminated before moved and the plurality of reference images. The authenticity of the medal M is judged according to comparison between the reference images corresponding to the specified three rotation angles θm, θm−θd, and θm+θd and the moved image to be discriminated. Therefore, since the number of reference images to be compared with the moved image to be discriminated is reduced, the time required for discrimination can be further shortened. In other words, the sorting is further made fast.

As described above, in the medal sorting device 100 according to one embodiment of the present disclosure, since a plurality of kinds of medals M different in diameter can be sorted into true medals TM and false medals FM easily with high accuracy, it is difficult to use false medals FM such as medals of another shop or altered medals so that an act of injustice can be prevented securely. In addition, since high-speed operation is possible, the medal sorting device can be sufficiently accepted in a Pachisuro machine in which medals M are slotted continuously by a skilled player.

Incidentally, the present disclosure is not limited to the above embodiment, but it may be modified variously. For example, in the above embodiment, the medal for play has been explained as an example, but the present disclosure can be applied to another kind of disk such as a coin or a token. Even in this case, an effect similar to that of the medal sorting device 100 can be obtained and the present disclosure is effective for prevention of an act of injustice.

Further, in this embodiment, the medal having a concavo-convex pattern has been explained as the example, but the present disclosure can also be applied to a disk having a pattern formed by printing or the like.

The present disclosure can be utilized in such a disk processing device as a game machine, an automatic vending machine, or an adjusting machine, and it is suitable for a device treating a plurality of kinds of disks different in diameter.

What is claimed is:

1. A disk image acquiring device, comprising:

a guide configured to guide a peripheral surface of a disk moving along a guide line;

an imaging window arranged approximately in parallel with one surface of the disk guided by the guide, the imaging window defining an image-taking region on the one surface of the disk;

a timing sensor configured to have a detection axis extending in a direction transverse to a moving direction of the disk guided by the guide, the timing sensor further configured to output a timing signal indicating an arrival of the disk at a predetermined position with respect to the imaging window, when the peripheral surface of the disk is detected at the detection axis; and an imager configured to take an image of the one surface of the disk via the imaging window based upon the timing signal output from the timing sensor, wherein a base line bisects the imaging window, bisects the disk when the disk is in the predetermined position, and does not bisect the disk when the disk in not in the predetermined position, the base line extending in a direction in which a bisector of an angle between the guide line and the detection axis extends, when viewed from a direction orthogonal to the imaging window, wherein the center of the disk is positioned on the bisector at the predetermined position, and wherein the circumference of the disk at the predetermined position is in contact with the both the guide line and the detection axis.

2. The disk image acquiring device according to claim 1, wherein the shape of the imaging window is a rectangle, and long sides of the rectangle are approximately parallel with the base line.

3. The disk image acquiring device according to claim 2, wherein the imaging window is approximately symmetrical about the base line as viewed from the direction orthogonal to the imaging window.

4. The disk image acquiring device according to claim 3, wherein:

the timing sensor comprises a photoelectric sensor, and a light axis of the photoelectric sensor comprises the detection axis.

5. The disk image acquiring device according to claim 1, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to take an image of the one surface of the disk positioned in the imaging window.

6. The disk image acquiring device according to claim 2, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to take an image of the one surface of the disk positioned in the imaging window.

7. The disk image acquiring device according to claim 3, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to take an image of the one surface of the disk positioned in the imaging window.

8. The disk image acquiring device according to claim 4, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to take an image of the one surface of the disk positioned in the imaging window.

9. A disk sorting device, comprising:

a guide configured to guide a peripheral surface of a disk moving along a guide line;

an imaging window arranged approximately in parallel with one surface of the disk guided by the guide, the imaging window defining an image-taking region on the one surface of the disk;

a timing sensor configured to have a detection axis extending in a direction transverse to a moving direction of the disk guided by the guide, the timing sensor further configured to output a timing signal indicating an arrival of the disk at a predetermined position with respect to the imaging window, when the peripheral surface of the disk is detected at the detection axis;

an imager configured to take an image of one surface of the disk via the imaging window based upon the timing signal output from the timing sensor;

a discriminator configured to compare the image taken by the imager with a predetermined reference image to make a judgment about authenticity of the disk; and a sorter configured to sort the disk into a true or false category based upon the judgement about authenticity of the disk made by the discriminator;

wherein a base line bisects the imaging window, bisects the disk when the disk is in the predetermined position, and does not bisect the disk when the disk in not in the predetermined position, the base line extending in a direction in which a bisector of an angle between the guide line and the detection axis extends, when viewed from a direction orthogonal to the imaging window, wherein the center of the disk is positioned on the bisector at the predetermined position, and wherein the circumference of the disk at the predetermined position is in contact with the both the guide line and the detection axis.

10. The disk sorting device according to claim 9, wherein the shape of the imaging window is a rectangle, and long sides of the rectangle are generally parallel with the base line.

11. The disk sorting device according to claim 10, wherein the imaging window is generally symmetrical about the base line as viewed from the direction orthogonal to the imaging window.

12. The disk sorting device according to claim 11, wherein the timing sensor comprises a photoelectric sensor, and a light axis of the photoelectric sensor comprises the detection axis.

13. The disk sorting device according to claim 9, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to image the one surface of the disk positioned in the imaging window.

14. The disk sorting device according to claim 10, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to image the one surface of the disk positioned in the imaging window.

15. The disk sorting device according to claim 11, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to image the one surface of the disk positioned in the imaging window.

16. The disk sorting device according to claim 12, wherein the imager comprises:

a surface floodlight extending in parallel to the imaging window and configured to project diffusion light toward the imaging window;

a half mirror disposed between the surface floodlight and the imaging window, the half mirror configured to transmit the diffusion light from the surface floodlight toward the imaging window and to reflect reflected light from the disk positioned in the imaging window in a direction parallel to the imaging window; and an area image sensor configured to receive reflected light from the half mirror to image the one surface of the disk positioned in the imaging window.

* * * * *